United States Patent [19]
Brauch et al.

[11] Patent Number: 5,553,088
[45] Date of Patent: Sep. 3, 1996

[54] LASER AMPLIFYING SYSTEM

[75] Inventors: Uwe Brauch, Stuttgart; Adolf Giesen, Renningen; Andreas Voss; Klaus Wittig, both of Stuttgart, all of Germany

[73] Assignees: Deutsche Forschungsanstalt fuer Luft- und Raumfahrt e.V., Bonn; Universitaet Stuttgart Institut fuer Strahlwerkzeuge, Stuttgart, both of Germany

[21] Appl. No.: 172,126

[22] Filed: Dec. 22, 1993

[30] Foreign Application Priority Data

Jul. 2, 1993 [DE] Germany ........................... 43 22 094.0

[51] Int. Cl.⁶ ....................................... H01S 3/04
[52] U.S. Cl. ............................. 372/34; 372/36; 372/71
[58] Field of Search .................... 372/34, 36, 41, 372/70, 71, 93

[56] References Cited

U.S. PATENT DOCUMENTS 3,631,362 12/1971 Almasi et al. .

(List continued on next page.)

FOREIGN PATENT DOCUMENTS

0567287A1 10/1993 European Pat. Off. .
3617362 11/1987 Germany .
4132063C2 7/1993 Germany .

OTHER PUBLICATIONS

"Laser Diode Pumped Solid State Lasers for Gravitational Wave Antenna"; Ueda et al; SPIE vol. 1837, pp. 336–345; Jan. 1992.

Saruwatari, et al., "LED Pumped Lithium Neodymium Tetraphosphate Lasers," *IEEE Journal of Quantum Electronics*, vol. QE–12, No. 10, Oct. 1976, pp. 584–591.

R. Iffländer, "Festkörperlaser zur Materialbearbeitung," Springer–Verlag, Heidelberg, Germany Jan. 1990, pp. 110 and 233.

J. D. Foster, et al., "Thermal Effects in a Nd:YAG Laser," *Journal of Applied Physics*, vol. 41, No. 9, Aug. 1970, pp. 3656–3663.

L. M. Osterink, et al., IEEE Int. Electron Devices Meeting, Oct. 1969, Washington, D.C.

Japanese Patent Application Abstract, Application No. 2–196805, *Patent Abstracts oF Japan*, E–1228, Jul. 3, 1992, vol. 16, No. 303.

W. Koechner, *Solid State Laser Engineering*, Springer–Verlag, Third Edition, Jan. 1992, FIG. 7.41 and description of Active Mirror Amplifier.

J. C. Lee et al., "Gain Squaring in a Cr:Hd:GSGG Active Mirror Amplifier Using a Cholesteric Liquid Crystal Mirror," *IEEE Journal of Quantum Electronics*, vol. 24, No. 11, Nov. 1988, pp. 2238–2242.

(List continued on next page.)

*Primary Examiner*—Rodney B. Bovernick
*Assistant Examiner*—Robert E. Wise
*Attorney, Agent, or Firm*—Barry R. Lipsitz

[57] ABSTRACT

A laser amplifying system is provided having a solid body arranged in a laser radiation field and including a laser active material that is pumped with a pumping light source. The solid body has a cooling surface and transfers heat created therein to a solid cooling element via the cooling surface. In this manner, a temperature gradient results in the solid body in a direction towards the cooling surface. The solid cooling element forms a carrier for the solid body. The laser radiation field propagates approximately parallel to the temperature gradient in the solid body. By enabling heat to be transferred to the solid cooling element via the cooling surface, this structure enables the solid body to be pumped at a high pumping power. Further, since the laser radiation field propagates approximately parallel to the temperature gradient in the solid body, the radiation field sees the same temperature gradient in all cross-sectional areas. Thus, the temperature gradient does not lead to an adverse effect on the beam quality of the laser radiation field at high pumping power.

50 Claims, 23 Drawing Sheets

U.S. PATENT DOCUMENTS

| | | | |
|---|---|---|---|
| 3,638,138 | 1/1972 | Bishop et al. | 372/36 |
| 3,753,145 | 8/1973 | Chesler | 372/71 |
| 4,429,394 | 1/1984 | Guch | 372/36 |
| 4,949,342 | 8/1990 | Kuper et al. | |
| 4,990,943 | 2/1991 | Phillips | 372/36 |
| 5,267,252 | 11/1993 | Amano | 372/36 |

OTHER PUBLICATIONS

P. J. Morris, et al., "Operation of resonantly pumped Tm:Ho"YAG in active mirror mode," *Optics Communications,* vol. 104, Dec. 15, 1993, pp. 97–101.

J. P. Cuthbertson et al., "Pumped–resonant excitation of the 946–nm Nd:YAG laser," *Optics Letters,* vol. 16, No. 6, Mar. 15, 1991, pp. 396–398.

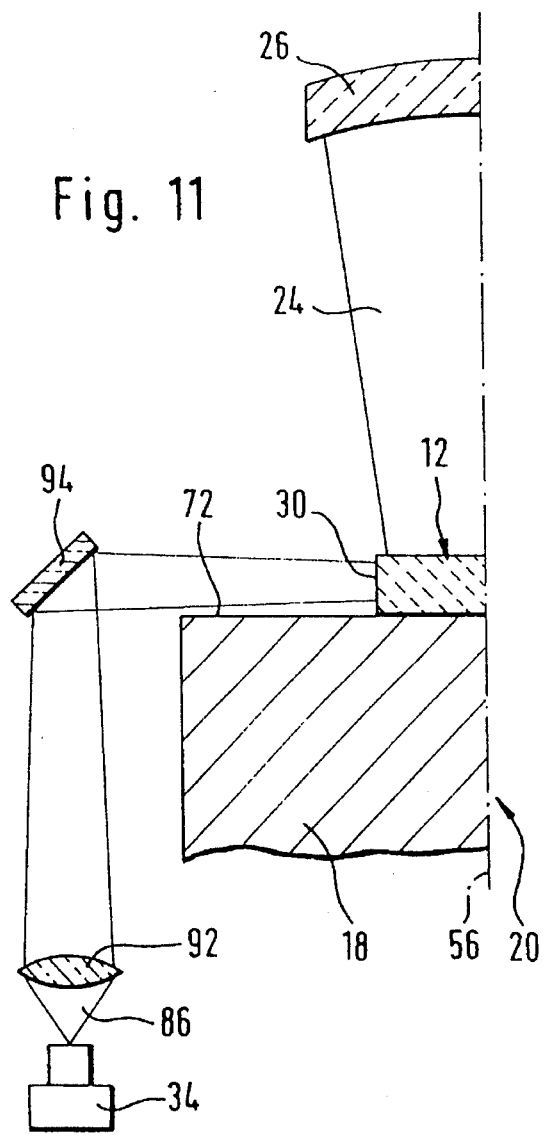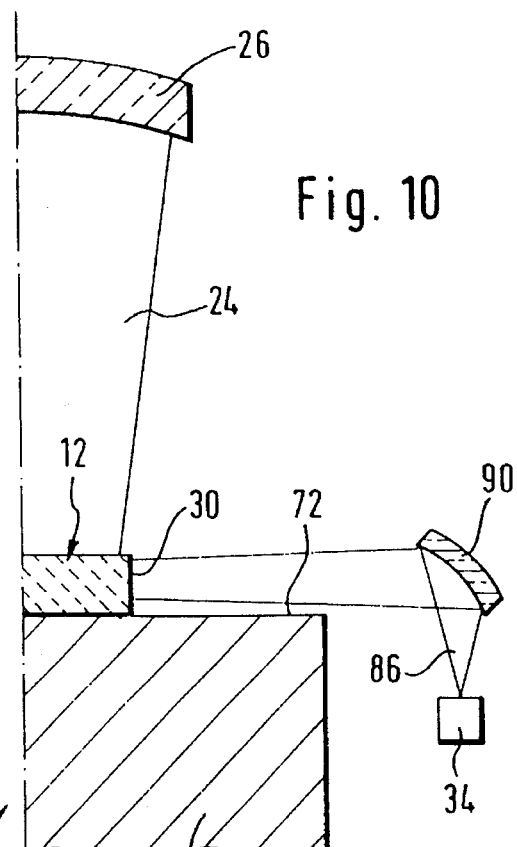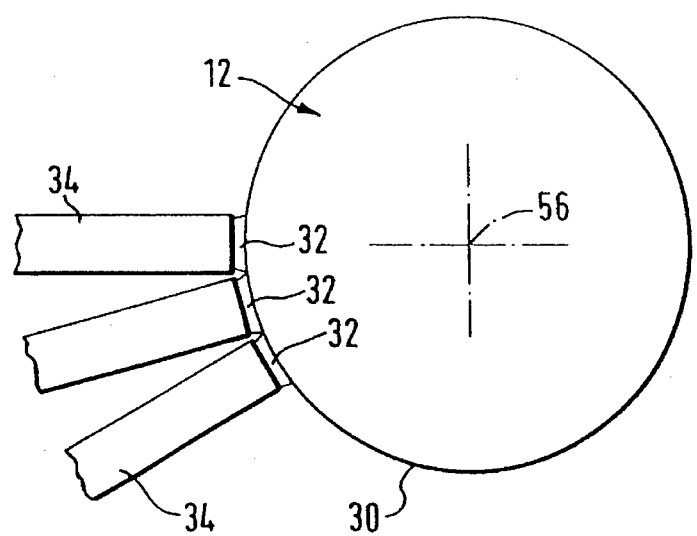

LASER AMPLIFYING SYSTEM

The invention relates to a laser amplifying system having a solid body arranged in a laser radiation field and comprising a laser-active material, and a pumping light source for pumping the laser-active material.

The problem with laser amplifying systems of this type is, in general, to achieve power which is as high as possible whilst having a crystal volume which is as low as possible.

This object is accomplished in accordance with the invention, in a laser amplifying system of the type described at the outset, in that the solid body has a cooling surface, that the solid body transfers heat created therein areally to a solid cooling element via the cooling surface so that a temperature gradient results in the solid body in a direction towards the cooling surface, that the solid cooling element forms a carrier for the solid body and that the laser radiation field propagates approximately parallel to the temperature gradient in the solid body.

The advantage of the inventive solution is to be seen in the fact that with this solution the solid body can be pumped at a high pumping power since the heat resulting thereby can be transferred to the solid cooling element via the cooling surface. At the same time, the temperature gradient thereby resulting in the solid body does not lead to a negative effect on the beam quality of the laser radiation field at high pumping power since the laser radiation field propagates approximately parallel to the temperature gradient in the solid body so that the laser radiation field "sees" the same temperature gradient in all the cross-sectional areas.

A solid cooling element is to be understood as a cooling element designed as a solid body, whereby this cooling element can be constructed from several materials.

In this respect, it is particularly advantageous for the cooling element to be produced from a material having a heat conductivity greater than the heat conductivity of the solid body. This ensures that the cooling element transfers the heat entering this from the solid body "more quickly" than it is supplied to the solid body due to its heat conductivity and, in particular, the difference in temperature within the cooling element and, therefore, between the solid body and, for example, a cooling medium remains slight.

In order to avoid any accumulation of heat occurring in the cooling element in the region near to the solid body, it is, in addition, particularly advantageous for the thickness of the cooling element at right angles to the cooling surface in a region bordering on the solid body to be greater than the quotient resulting from the area of the cooling surface divided by its circumference. This means that within the solid cooling element a sufficiently large cross-sectional area is available for the effective removal of the heat entering the cooling element from the solid body.

In order to be able to distribute the heat coming from the solid body as quickly as possible, it is, in addition, advantageous for the cooling element to have a carrier surface for the solid body which is larger than the cooling surface so that the heat coming from the solid body is distributed onto a cross-sectional area which is as large as possible and as far as possible directly following the cooling surface.

With respect to the type of design for the cooling surface, no details have been given in conjunction with the comments on the preceding embodiments. For example, in an advantageous embodiment the cooling surface has in a first direction a dimension which is greater than a thickness of the solid body measured at right angles to the cooling surface.

It is even more advantageous for the solid body to be designed in the shape of a small plate and rest on the cooling element with at least one small-plate upper or lower side as cooling surface.

The areal conduction of heat from the solid body to the cooling element could, for example, take place via partial surface regions of the cooling surface located next to one another. It is particularly advantageous for the solid body to transfer the heat created therein from the cooling surface to the cooling element over the entire surface.

With respect to the design of the cooling element and the further removal of the heat from the cooling element, no details have been given in conjunction with the preceding comments on individual embodiments. For example, an advantageous embodiment provides for the cooling element to have a heat-transferring surface in contact with a cooling medium, this surface amounting to a multiple of the area of the cooling surface.

This may be realized particularly advantageously when the cooling element is penetrated by cooling channels, the wall surfaces of which form the heat-transferring surface.

No details have so far been given concerning the material of the cooling element. In an advantageous embodiment, for example, the cooling element is designed to be transparent for the laser radiation field.

In this embodiment, there is, for example, the possibility of arranging the cooling element and the solid body such that both are penetrated by the laser radiation field in a direction transverse to the cooling surface.

This solution can be developed further, in particular, for achieving high power when the laser radiation field penetrates a plurality of consecutive solid bodies and a cooling element is arranged each time between the consecutive solid bodies.

A particularly advantageous power output may be achieved in a laser of the inventive type when a reflector for the laser radiation field is arranged on the side of the solid body, on which this bears the cooling surface. This reflector for the laser radiation field creates the possibility of the laser radiation field penetrating the solid body several times and, therefore, an improved amplification is the result.

This can be combined particularly advantageously with the cooling element provided in accordance with the invention when the solid body rests with the cooling surface on the reflector for the laser radiation field over the entire surface and, in particular, the reflector is comprised by the cooling element. In this respect, the reflector is preferably designed such that heat is introduced areally into a cooling body of the cooling element via the reflector.

In a particularly expedient embodiment, the reflector is a reflector layer applied to the cooling surface so that this reflector surface is very thin and an efficient conduction of heat to the cooling body of the cooling element can preferably take place through this thin reflector layer.

In the embodiments of the inventive laser amplifying system, in which a reflector is provided, this is expediently designed such that the laser radiation field enters the solid body from a surface of the solid body located opposite the cooling surface.

No details have been given in conjunction with the preceding description of the embodiments with respect to the coupling-in of the pumping light into the solid body.

In a particularly advantageous embodiment, for example, the solid body has at least one side surface which extends transversely to the cooling surface and via which the pumping light is coupled in.

The coupling-in of the pumping light can, in principle, take place in any optional manner. It is, however, particularly advantageous for the pumping light to be guided in the solid body by reflection so that the laser-active material in the solid body is excited as uniformly as possible.

The laser-active material in the solid body can be excited particularly uniformly and advantageously when the pumping light is guided in the solid body approximately parallel to the cooling surface.

A particularly expedient solution provides for the pumping light to be guided in the solid body by the cooling surface and a surface located opposite the cooling surface.

The pumping light is guided particularly expediently by total reflection. The guidance of the pumping light by total reflection always occurs when the divergence of the pumping light in the solid body is such that the pumping light in the solid body impinges on the surfaces guiding the pumping light at an angle smaller than the limiting angle of the total reflection.

Such an adjustment of the divergence can be achieved by suitable imaging systems for the focusing of the pumping light onto the solid body.

It is particularly advantageous, especially in order to obtain an excitation in the solid body which is as good and uniform as possible, for the divergence of the pumping light in the solid body to be so great that the pumping light impinges on the surfaces of the solid body guiding this pumping light at an angle close to the limiting angle of the total reflection.

Such a guidance of the pumping light can take place either by total reflection or by an additional reflecting coating on the cooling surface and on the surface located opposite thereto, whereby this coating has, preferably, to be such that at least one of them is transparent for the laser radiation field.

Alternatively to coupling in the pumping light via a side surface, an additional, advantageous embodiment provides for the pumping light to be coupled in via a surface located opposite the cooling surface.

In this respect, a reflector for the pumping light is preferably provided on the side of the solid body, on which the cooling surface is located.

It is then particularly expedient for the solid body to rest with the cooling surface on the reflector for the pumping light over the entire surface and for the reflector to be comprised by the cooling element so that, in particular, the heat can be introduced areally into a cooling body of the cooling medium via the reflector.

In the simplest case, the reflector is hereby arranged as a reflector layer on the solid body.

In a particularly advantageous embodiment, the reflector for the laser radiation field and the reflector for the pumping light are identical to one another, i.e. the reflector reflects both the laser radiation field as well as the pumping light.

In order to achieve a pumping of the laser-active material in the solid body which is as effective as possible, the pumping light penetrates the solid body at least twice. This can, for example, be achieved by a reflector specified above.

It is even better for the pumping light to penetrate the solid body more than twice. For example, it is possible for the solid body to be irradiated four times when the beam of pumping light reflected by the reflector is again reflected back into the solid body and onto the reflector by a mirror.

With respect to the designs of the reflector, either as a reflector for the laser radiation field or as a reflector for the pumping light, no additional, specific details have been given. In an advantageous embodiment, for example, the reflector is formed by a highly reflective reflector layer applied directly to the cooling surface of the solid body.

In order to obtain a good heat conduction from the reflector layer to the cooling body, it is advantageous for a metal layer to be applied to the side of the reflector layer located opposite the solid body. This metal layer allows, in particular, as good a heat contact as possible to be established between the reflector layer and the cooling body.

The metal layer is preferably connected to the cooling body with areal heat contact.

This is possible, in particular, when the metal layer is connected to the cooling body by means of a soft metal, whereby the soft metal can, for example, be a soft solder or indium.

In an embodiment designed in this manner, the cooling element in this case comprises both the cooling body and also the soft metal for connecting the cooling body to the metal layer, as well as the metal layer and also the reflector layer since all these components conduct the heat areally away from the solid body.

With respect to the guidance of the pumping light, only the guidance thereof by reflection, preferably parallel to the cooling surface or at right angles thereto, has been described in conjunction with the embodiments described in the above.

A particularly advantageous embodiment of the inventive solution provides for the laser amplifying system to be designed to be resonator-free for a laser radiation field in planes parallel to the cooling surface in order to prevent the formation of a laser radiation field parallel to the cooling surface.

This is possible, for example, when a material adapting the refractive index is provided adjacent the side surfaces. This means that a total reflection does not occur at the side surfaces but rather a transition of evolving laser radiation into the material adapting the refractive index, proceeding from which a return reflection for the formation of a resonator geometry is improbable.

Alternatively thereto, an advantageous embodiment provides for the solid body to have an inner region pumped by the pumping light and an outer region not pumped thereby.

An additional, advantageous embodiment provides for the solid body to have an inner region comprising the laser-active material and an outer region free from laser-active material.

The outer region is preferably designed such that it has the same refractive index as the inner region. This can be achieved in the simplest way by the outer region and the inner region being made from the same solid body material.

A configuration of this type is particularly simple to produce when the outer region and the inner region are connected to one another by bonding.

With respect to the design of the pumping light sources, no additional details have been given in conjunction with the preceding comments on individual embodiments.

In a particularly advantageous embodiment, the pumping light source comprises one or more laser or superradiation diodes. Laser or superradiation diodes of this type have the advantage that they are very compact and make available pumping light having a high power density and have, at the same time, a wavelength which leads to as low a heat development in the solid body as possible at a high absorption.

The pumping light of the laser or superradiation diode is preferably guided to the solid body by a light guide, preferably an optical fiber.

In the simplest case, the light guide terminates with its end near the solid body at a side surface of the solid body, whereby the light guide can abut with this end on the side surface or be arranged at a slight distance therefrom.

For example, by varying the distance between the side surface and the end of the light guide near the solid body an optimum coupling-in of the pumping light into the solid body can be set, namely, for example, such that the pumping light is guided in the solid body by reflection.

The coupling-in of the pumping light into the solid body can be improved still further when, alternatively or in addition to the provision of a light guide, an optical imaging means is provided between the pumping light source and the solid body. The optical imaging means could, for example, be a lens between each pumping light source and the solid body.

In particular in the case of a solid body in the shape of a circular disc, it has proven to be particularly advantageous for the optical imaging means to comprise an annular lens.

An alternative solution for the lens in the optical imaging means provides for the optical imaging means to comprise a reflector, whereby the reflector has either a plane or a curved surface.

In the case of a circular disc of the solid body, a reflector ring extending around the solid body is preferably provided.

In order, in addition, to obtain conditions during the entry of the pumping light into the solid body which are as free from reflection as possible, it is preferable for the surface of the solid body penetrated by the pumping light to be provided with an antireflective coating.

Additionally, in order to obtain a coupling-in of the laser radiation field in the solid body which is likewise as free from reflection as possible, it is advantageous for the surface of the solid body penetrated by the laser radiation field to be provided with an antireflective coating.

In order to obtain high laser power, it is necessary to guide the laser radiation field such that this penetrates a plurality of the inventive solid bodies in their inventive arrangement.

For this reason, a preferred solution provides for the laser radiation field in the laser amplifying system to be subjected to a plurality of reflections and for a solid body to be arranged in the region of several of these reflections.

In a particularly simple solution, the reflections take place each time at a reflector which is comprised by a cooling element for the respective solid body.

In this respect, the laser radiation field is preferably guided in the laser amplifying system in a zigzag course between inventive solid bodies which are arranged opposite one another.

In conjunction with the laser amplifying systems described above, no details have been given regarding the use of such laser amplifying systems. One advantageous possibility of using an inventive laser amplifying system provides for this to serve as amplifier for incoming laser radiation.

An alternative or additional possibility provides for the inventive laser amplifying system to be combined with a resonator to form a laser system, whereby a laser system of this type can also comprise a folded radiation path.

Alternatively to a folded radiation path, it is advantageous to provide resonators having an annular radiation path, so-called ring resonators, whereby an inventive solid body is arranged each time at one or several reflections of the laser radiation field.

In order to obtain particularly high power, a particularly advantageous configuration within the scope of the invention provides for the inventive laser amplifying system to be both part of a laser system and also part of a laser amplifier following this laser system.

No details have so far been given with respect to the formation of the temperature gradient in the solid body. In a particularly advantageous embodiment, for example, the temperature gradient in the solid body is essentially constant transversely to the direction of propagation of the laser radiation field in the region penetrated by the laser radiation field in order to avoid any negative effects of a varying temperature gradient and, therefore, of a varying optical density caused thereby on the laser radiation field.

It is even more advantageous for the temperature gradient in the solid body to be essentially constant transversely to the direction of propagation of the laser radiation field in the region penetrated by the pumping light. In this respect, the region of the solid body penetrated by the pumping light is of the same size or larger than the region penetrated by the laser radiation field so that it is automatically ensured in the region penetrated by the laser radiation field, as well, that the temperature gradient in the solid body is essentially constant transversely to the laser radiation field over its extension.

In this respect, a temperature gradient of this type can preferably be achieved when the solid body has isothermal lines extending essentially parallel to the cooling surface in the region penetrated by the laser radiation field.

A constant temperature gradient as explained above and/or a course of the isothermal lines as explained above may be attained, in particular, when the pumping light has an essentially constant distribution of intensity over the respective region extending transversely to the direction of propagation of the laser radiation field and, therefore, heats the solid body essentially uniformly.

In order to avoid the solid body being subjected to unilateral stresses, for example directed parallel to the surface located opposite the cooling surface, due to a temperature gradient forming near the surface located opposite the cooling surface and directed parallel thereto, it is preferable for the solid body to have isothermal lines extending towards the cooling surface and the surface located opposite the cooling surface. As a result, a temperature gradient extending parallel to the respective surface exists near to both the cooling surface as well as the surface located opposite the cooling surface and thermal stresses are therefore present near to both surfaces.

It is then particularly advantageous for the course of the isothermal lines outside a region penetrated by the pumping light to have a gradient near the surface which extends parallel to the cooling surface and close thereto, this gradient being of a comparable dimension to a gradient near the surface which extends parallel to the surface located opposite the cooling surface and close thereto. Due to the comparable dimensions of these gradients it is expediently ensured that the thermal stresses are essentially of the same size in the region of the two surfaces located opposite one another.

It is even more advantageous for the two temperature gradients near the surface to be essentially of a comparable size.

Large temperature gradients which extend parallel to the cooling surface or surface and, in particular, are formed only on one of these two surfaces, can be avoided, in particular, when the solid body extends beyond the cooling surface in a direction parallel to the cooling surface and therefore comprises a region extending outside the cooling surface which has the possibility of taking up a higher temperature than the cooling surface.

In order, however, to ensure in this embodiment that the isothermal lines extend parallel to one another and, preferably, parallel to the cooling surface in the region penetrated by the laser radiation field, the cooling surface extends beyond the region penetrated by the laser radiation field in directions extending parallel to this surface. It is even more advantageous for the cooling surface to extend in this manner beyond the region penetrated by the pumping light.

Alternatively or additionally to the possibilities described above with respect to the configuration of the cooling surface in relation to the region penetrated by the laser radiation field or by the pumping light, considerable temperature gradients parallel to the cooling surface or to the surface located opposite thereto may be decreased in that the solid body is attemperatable in its region lying outside the cooling surface. With such an attemperation of the solid body it is possible to heat and attemperate the volume areas of the solid body located outside the region irradiated by the pumping light in a manner corresponding to the heating of the solid body by the pumping light so that a temperature gradient extending parallel to the cooling surface or to the surface can be considerably decreased or, in the ideal case, essentially reduced.

This may be advantageously achieved, in particular, when the solid body is attemperatable in its region lying outside the cooling surface to a temperature reducing a temperature gradient parallel to the cooling surface or to the surface parallel thereto.

The attemperability can result in any optional manner due to heat input.

In the simplest case, by the solid body being heatable accordingly.

Such heating is possible either through heat contact of the solid body with a heating element or by irradiating the solid body, preferably with an electromagnetic radiation which can easily be absorbed by the solid body.

It is particularly advantageous, in particular to ensure continuous operation, for the solid body to be attemperatable to a defined temperature in its region lying outside the cooling surface.

The solid body is preferably attemperated outside the cooling surface to a temperature which is above the temperature of the cooling surface. The solid body is preferably attemperated such that temperature gradients, which are smaller than temperature gradients destroying the solid body, are generated in the solid body, in particular outside the region penetrated by the laser radiation field.

With respect to the type of solid body having a laser-active material which may be used in conjunction with the inventive concepts, no details have so far been given. For example, the inventive solution is provided for neodymium or ytterbium as laser-active material, incorporated into known host materials—such as, e.g., YAG or FAP—for these laser-active materials, as solid body.

As measurements for the inventive solid bodies, dimensions are preferably used in which the solid body has a diameter of up to 10 mm, 30 mm maximum.

The average diameters of the solid bodies amount to approximately 4 to approximately 60 times the thicknesses of the solid bodies. In addition, the thicknesses of the solid bodies are between approximately 0.1 and approximately 1 mm during one-sided cooling thereof and between approximately 0.1 mm and approximately 2 mm during two-sided cooling.

Again, no details have so far been given with respect to the construction of the cooling elements. In an advantageous embodiment of a cooling element, for example, this is made from metal, preferably a metal having a good heat conductivity, i.e., for example, copper. In the case of a transparent cooling element, this is produced from diamond type 2A or from monocrystalline silicon carbide.

Additional features and advantages of the invention are the subject matter of the following description as well as of the drawings of several embodiments. In the drawings, FIG. 1 shows a first embodiment of an inventive laser amplifying system as part of a laser system;

FIG. 2 is a cut-through perspective illustration of an inventive crystal in the same plane of illustration as FIG. 1;

FIG. 3 and 3A provide an enlarged illustration of a cooling element with a crystal seated thereon;

FIG. 10 is an additional variation relating to the coupling-in of pumping light into the crystal, illustrated similar to FIG. 1;

FIG. 11 is an additional variation relating to the coupling-in of pumping light into the crystal in an illustration similar to FIG. 1;

FIG. 12 is an additional variation of the first embodiment relating to the coupling-in of pumping light into the crystal in an illustration similar to FIG. 4;

Table 1 is a list of solid body materials preferably used within the scope of the inventive embodiments and parameters thereof.

Figure 1:
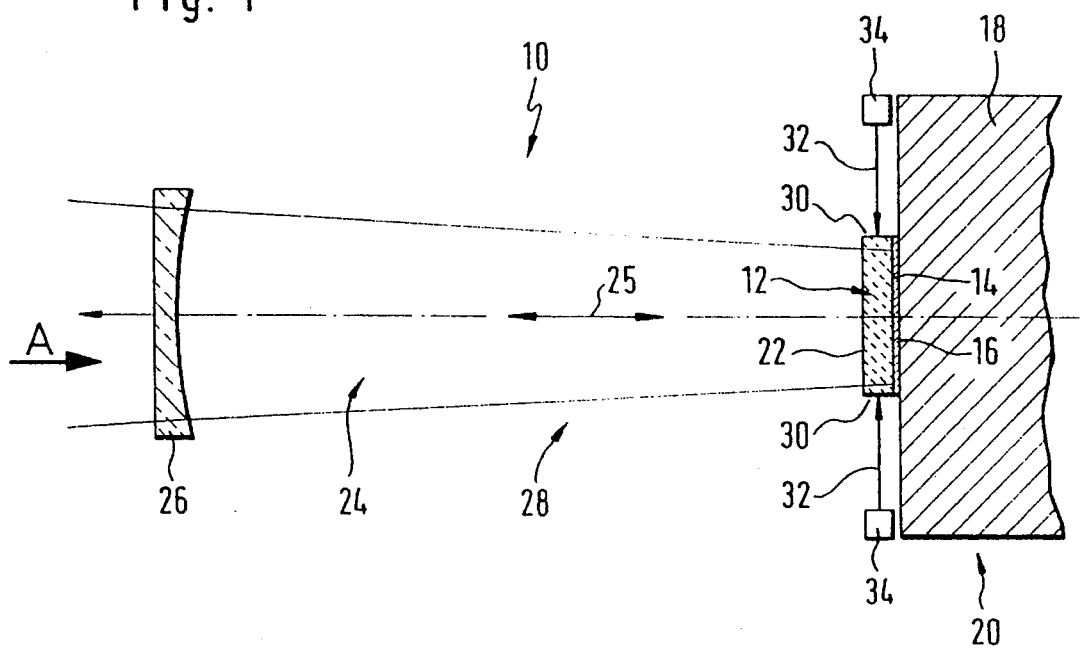

An embodiment of an inventive laser amplifying system, designated in FIG. 1 as a whole as 10, comprises a radiation-amplifying crystal 12 made from ytterbium-doped crystal material; this crystal has a cooling surface 14 which, for its part, bears a reflector layer 16. This reflector layer 16 is connected over its entire surface in a heat conducting manner with a cooling body 18 so that the reflector layer 16 and the cooling body 18 together form a cooling element 20, on which the crystal 12 rests with its cooling surface 14 over the entire surface.

Opposite the cooling surface 14 the crystal 12 bears a surface 22 which is penetrated by a laser radiation field 24.

This laser radiation field 24 is formed, on the one hand, between a coupling-out mirror 26 and the reflector layer 16 which, together, form a resonator which is designated as a whole as 28 and supplements the laser amplifying system 10 to form a laser system.

The laser radiation field 24 of the resonator 28 therefore penetrates the surface 22 of the crystal 12, enters this crystal and is reflected by the reflector layer 16, on which the crystal 12 is seated with its cooling surface 14.

The crystal 12 also has side surfaces 30 which extend transversely, preferably at right angles, to the cooling surface 14. These side surfaces are penetrated by pumping light 32 from pumping light radiation sources 34, whereby the pumping light 32 leads to an excitation of the volume in the crystal 12, in particular in the region thereof penetrated by the laser radiation field 24.

Figure 2:
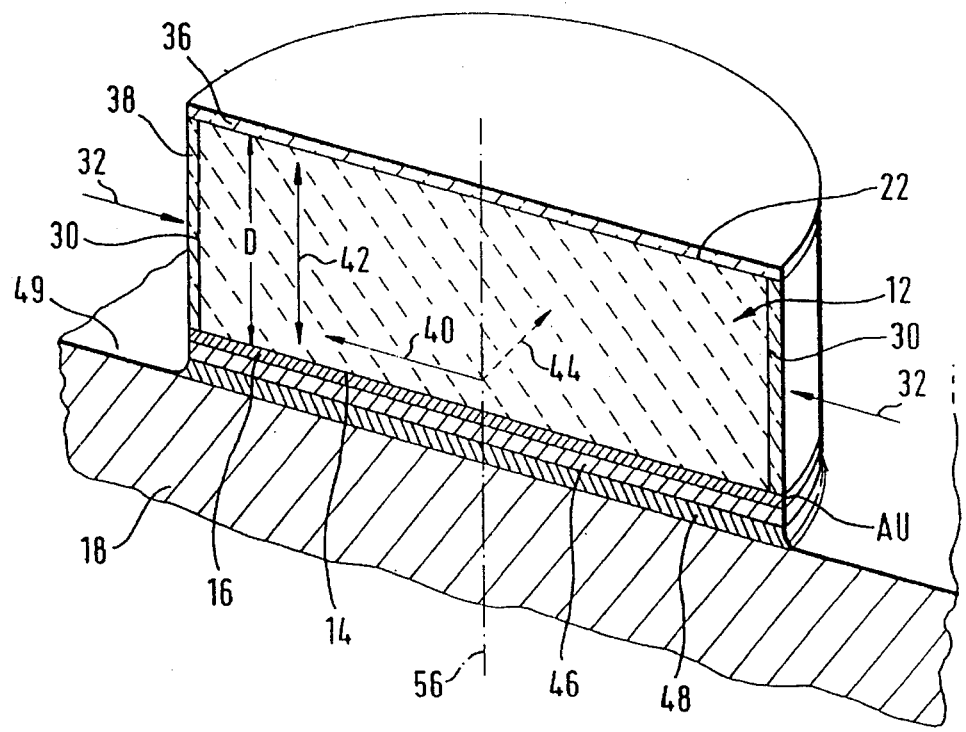

As illustrated in FIG. 2, the inventive crystal 12 is seated with the cooling surface 14 on the reflector layer 16 which is preferably applied to the cooling surface 14 as a highly reflective coating.

Furthermore, the inventive crystal 12 bears on its surface 22 located opposite the cooling surface 14 an antireflective coating 36 which is designed to be antireflective for the laser radiation field 24. In addition, the side surfaces 30 are likewise provided with an antireflective coating 38 which is designed to be antireflective for the pumping light 32.

The inventive crystal is preferably a crystal disc, the cooling surface 14 of which is designed as a circular disc and thus has at least in a surface direction 40 a dimension which is greater, preferably several times greater, than a thickness D of the crystal, measured in a direction 42 which is at right angles to the surface direction 40.

In the case of the inventive, circular cooling surface 14, a second surface direction 44 which is at right angles to the surface direction 40 has a dimension which is likewise greater than the thickness D.

In order to obtain an effective thermal coupling of the crystal 12 to the cooling body 18, the reflector layer 16 is provided on its side facing away from the crystal 12 with a metal layer 46, preferably of copper, which, for its part, is connected areally via a contact layer 48 made of soft metal—preferably of soft solder or indium—with a carrier surface 49 of the cooling body.

In addition, the heat conductivity of the cooling element 20 is greater than that of the crystal so that a more effective heat conduction takes place in the cooling element 20 than in the crystal 12 and a temperature gradient results in the crystal 12 which is parallel to the direction 42 and therefore extends essentially parallel to a direction of propagation 25 of the laser radiation field 24.

Figure 3A:
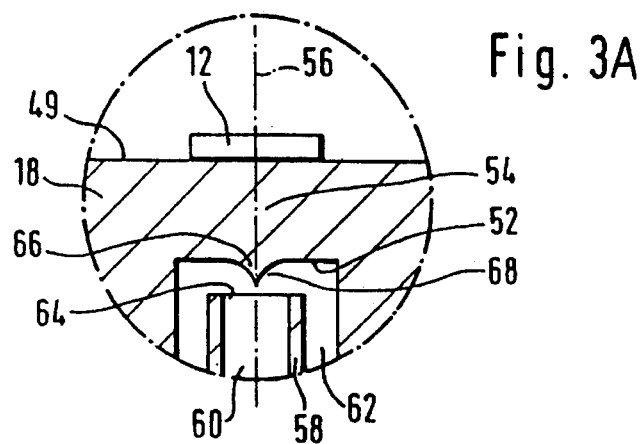
Figure 3:
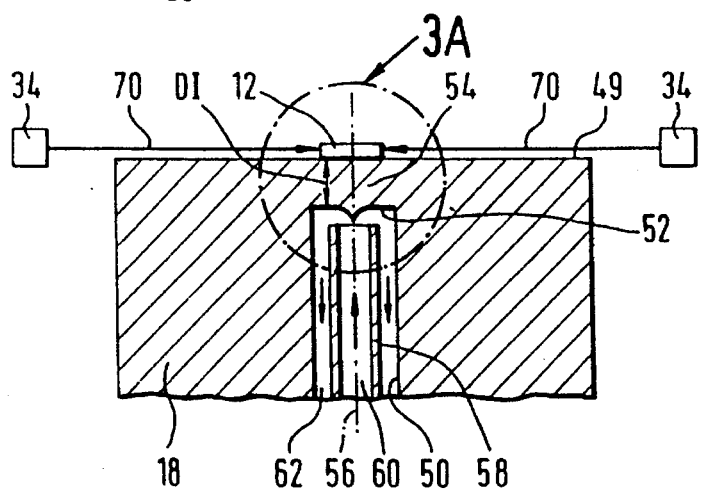

As illustrated in FIG. 3, the cooling body 18 is provided with a cooling bore 50 extending therein, this bore ending with a base 52 in a region 54 of the cooling body 18 which is located adjacent the crystal 12. The cooling bore 50 preferably extends along an axis 56, relative to which the crystal 12 is also coaxially aligned.

In order to have a cooling medium, preferably water, flowing through the cooling bore, a pipe 58 projects into the cooling bore 50 and forms a supply channel 60 located within the pipe and an outlet channel 62 lying between the supply channel and the cooling bore 50.

In addition, an opening 64 of the pipe 58 points in the direction of the base 52, whereby the base 52 is provided with a deflecting cone 66 which is preferably arranged coaxially to the axis 56 and therefore projects centrally away from the base 52 towards the opening 54. This deflecting cone 66 forms with its cone-shaped shell surfaces 68 deflecting surfaces which deflect the cooling medium coming from the supply channel 60 in radial direction relative to the axis 56 towards the outlet channel 62. Due to this deflecting cone 66 with the deflecting surfaces 68, an intensive heat exchange is possible between the cooling medium flowing in through the supply channel 60 and the cooling body 18, in particular its region 54, so that an efficient cooling of the region 54 and also of the crystal 12 seated thereon takes place via the cooling medium.

The region 54 preferably has a thickness DI which is greater than the quotient of the cooling surface 14 divided by its external circumference AU so that in the cooling body 18 the heat conduction through an imaginary cylinder surface having the circumference U and the height DI is better than the heat conduction via the cooling surface 14 and so no heat accumulation can occur in the region 54.

Preferably, a heat-transferring surface of the cooling body 18 which is formed by the cone-shaped shell surfaces 68, the base 52 and wall surfaces of the bore 50 is many times larger than the cooling surface.

In the simplest case, water is used as cooling medium.

The cooling medium is preferably supplied to the supply channel 60 and carried off from the outlet channel 62 and cooled to a predetermined temperature by a cooling means not illustrated in FIG. 3.

Figure 4:
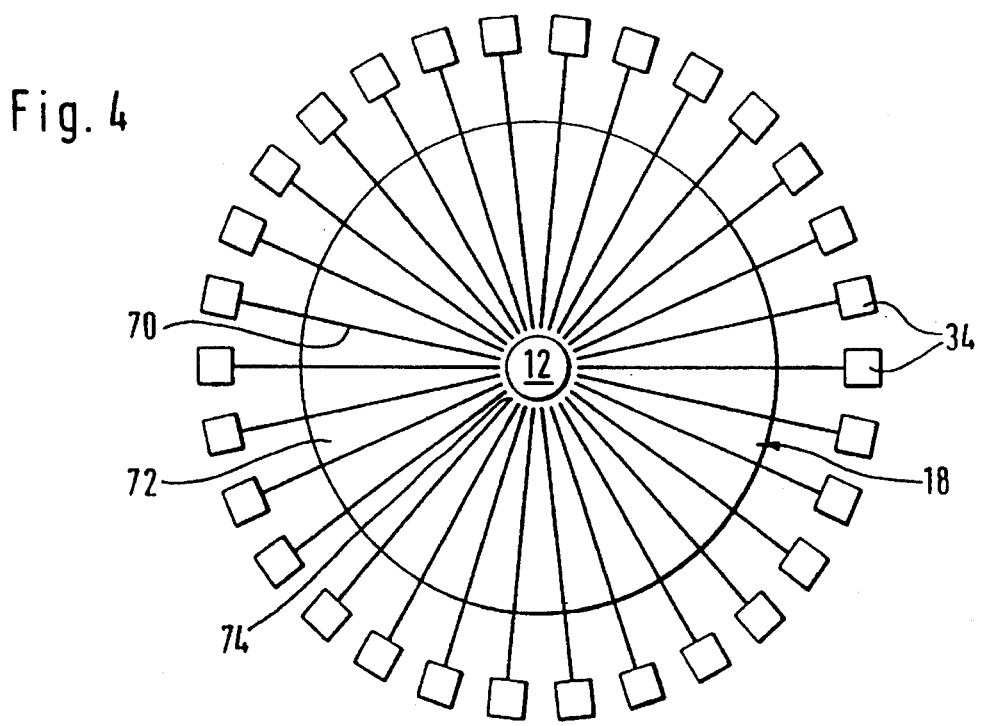
FIG. 4 is a variation relating to the coupling-in of pumping light into the crystal, seen in the direction of arrow A in FIG. 1.
Figure 5:
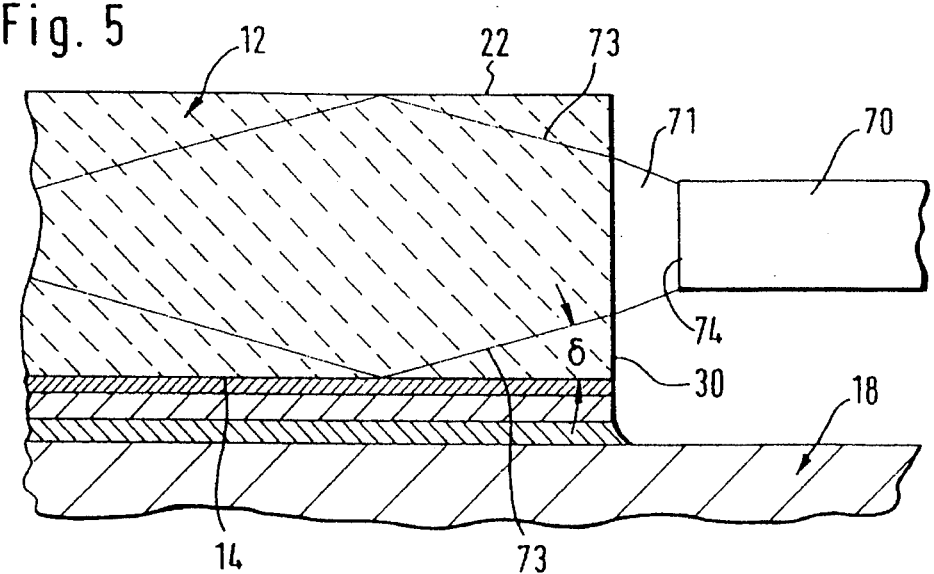
FIG. 5 is a partial longitudinal section similar to FIG. 2 through the variation shown in FIG. 4.

As illustrated in FIG. 4, the pumping light 32 supplied from the pumping light sources 34 is preferably coupled into the crystal 12 by means of light guides 70 which extend from the pumping light sources 34 in the direction of the crystal 12 and, for example as illustrated in FIG. 5, terminate with their ends 74 near the crystal at a slight distance from the crystal 12.

The pumping light 32 exiting from these ends 74 near the crystal diverges in a cone 71 until it impinges on the side surface 30 and is refracted again in the crystal 12 so that the peripheral radiation 73 of the cone resulting in the crystal 12 impinges on the cooling surface 14 and the surface 22 at an angle δ which is smaller than the angle of the limiting angle of the total reflection and these surfaces 14, 22.

This means that the pumping light 32 is guided in the crystal 12 in the directions 40 or 44 by total reflection and results in an essentially uniform volume excitation of the entire crystal 12.

The pumping light sources 34 are preferably arranged all around the crystal 12 in a plane parallel to an upper side 72 of the cooling body 18 and the light guides 70 also extend in a plane 72 parallel to the carrier surface 49 from the pumping light sources 34 to the side surfaces 30 of the crystal 12.

In order to be able to couple as much pumping light as possible into the crystal 12, the light guides 70 are expediently arranged such that they are adjacent one another with their ends 74 near the crystal in the region of their outer surfaces.

Figure 6:
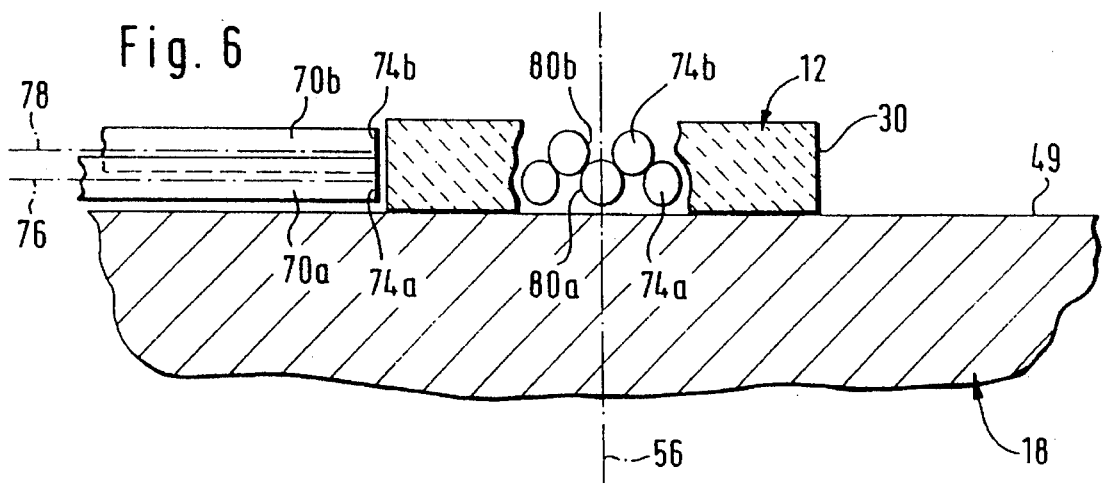
FIG. 6 is an additional variation relating to the coupling-in of pumping light into the crystal, illustrated similar to FIG. 1.
Figure 7:
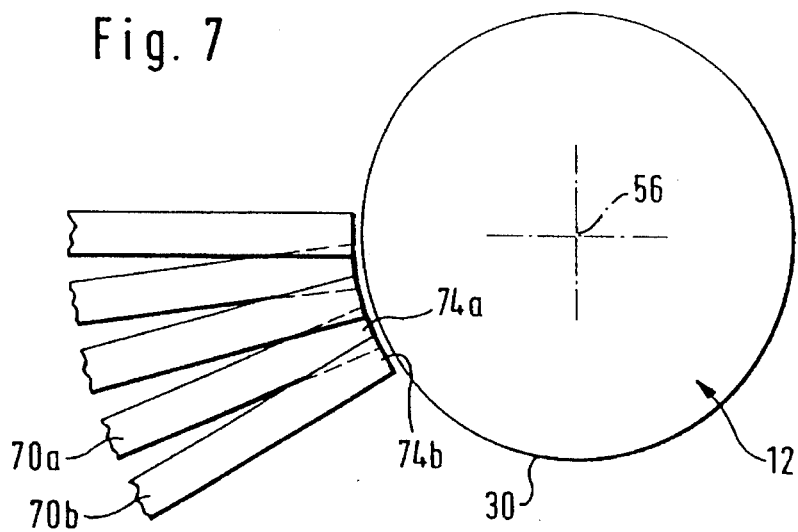
FIG. 7 is a plan view similar to FIG. 4 onto the additional variation.

Even more advantageous is an arrangement of the light guides 70, which are preferably optical fibers, according to the configuration illustrated in FIGS. 6 and 7. In this configuration, fibers 70a arranged in a plane 76 and fibers 70b arranged in a plane 78 are used, whereby the planes 76 and 78 also extend parallel to the carrier surface 49 and are preferably arranged such that the ends 74b and 74a of the respective fibers 70a or 70b near the crystal touch one another with their outer casings 80a and 80b, respectively, and the ends 74a near the crystal are arranged relative to the ends 74b near the crystal, and vice versa, so as to be staggered.

Figure 8:
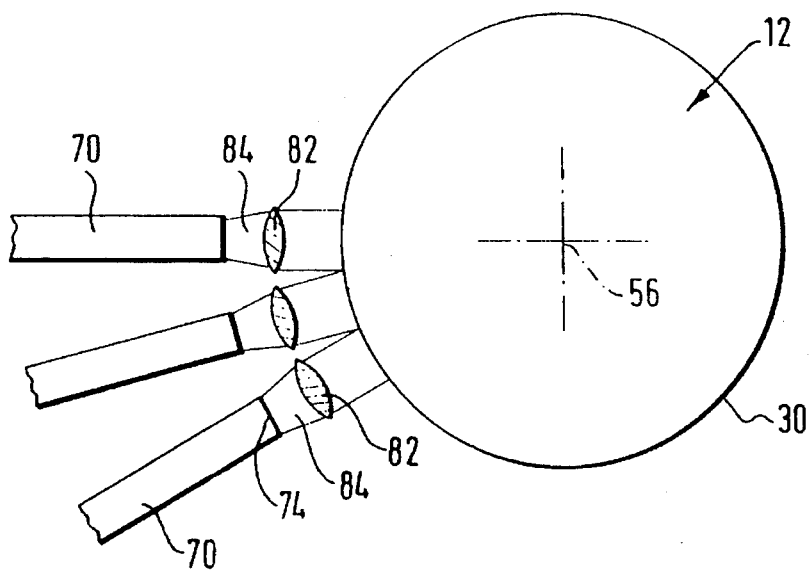
FIG. 8 is a plan view similar to FIG. 4 onto an additional variation of the first embodiment relating to the coupling-in of pumping light into the crystal.

In a variation of the inventive solution, illustrated in FIG. 8, the fibers 70 are located with their ends 74 near the crystal at a distance from the side surfaces 30 of the crystal 12 and lenses 82 are arranged between the ends 74 near the crystal and the side surfaces 30 as optical imaging means. These lenses focus divergent pumping light 84 exiting from the ends 74 near the crystal onto the side surfaces 30.

According to the invention, laser diodes are used in all the preceding embodiments as pumping light sources 34.

Figure 9:
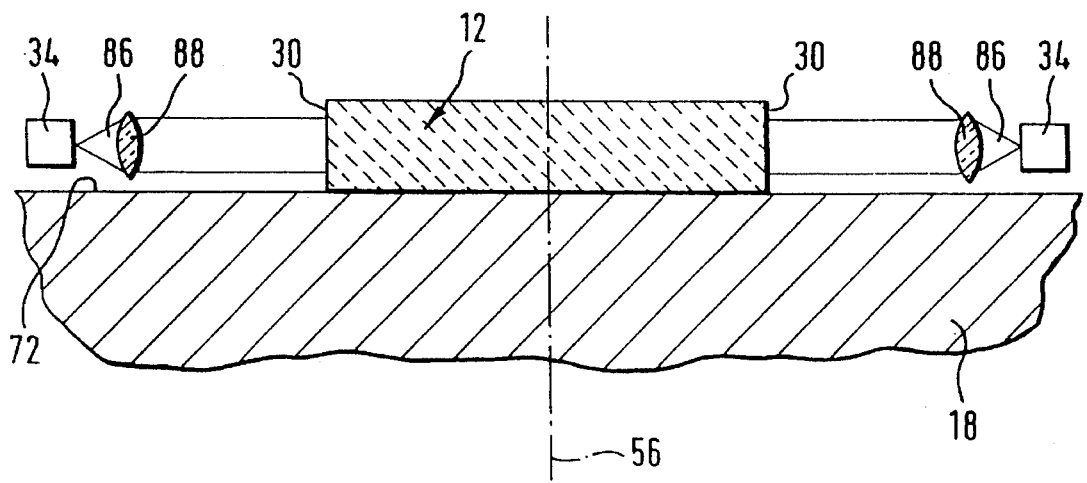
FIG. 9 is an illustration similar to FIG. 1 of an additional variation relating to the coupling-in of pumping light into the crystal.

A further variation of the inventive solution, illustrated in FIG. 9, provides for laser diodes only to be used as pumping light sources 34 but no light guides 70; rather, a divergent radiation cone 86 which exits from each of the laser diodes 34 is focused onto the side surface 30 of the crystal 12 by a lens-comprising optical means 88, whereby the lens-comprising optical means 88 is preferably designed as a ring-shaped annular lens arranged coaxially to the axis 56 and in a plane parallel to the upper side 72 or as an annular cylinder lens with a convex cross section.

An additional, alternative variation, illustrated in FIG. 10, provides for a parabolic mirror 90 which focuses the divergent radiation cone 86, which exits from a laser diode serving as pumping light source 34, onto the side surface 30 of the crystal 12 by reflection. In the case of a crystal 12 which is rotationally symmetrical to the axis 56, this parabolic mirror 90 is preferably ring-shaped in design and coaxial to the axis 56 and therefore represents a segment of an annular toroid.

Alternatively thereto, an additional variation of the inventive solution, which is illustrated in FIG. 11 and is rotationally symmetrical to the axis 56, provides for the divergent radiation cone 86 of a laser diode as pumping light source 34 to be focused onto the side surface 30 of the crystal 12 by means of a lens 92, combined with a mirror 94.

In both variations according to FIG. 10 and FIG. 11 it is possible to arrange the pumping light source 34, for example in the form of a laser diode, next to the cooling body 18 and to connect it to the cooling body for the purpose of heat conduction.

In a further variation of the inventive solution, as illustrated in FIG. 12, the pumping light sources 34 are arranged directly adjacent the side surface 30 in the form of laser diodes so that no coupling element whatsoever is necessary and the pumping light radiation exiting from these laser diodes 34 enters directly into the crystal 12 in order to excite the crystal material without any imaging element being provided between the laser diodes 34 and the crystal 12.

Figure 13:
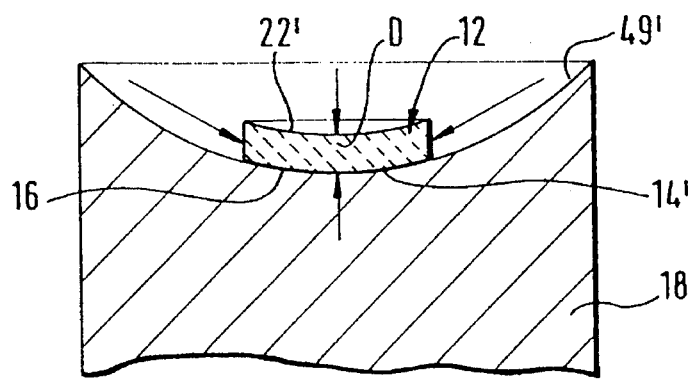
FIG. 13 is an additional variation of the first embodiment relating to the shape of the crystal in an illustration similar to FIG. 1.

In a further variation of an inventive laser amplifier, illustrated in FIG. 13, the cooling body 18 does not have a plane carrier surface 49 but a concavely curved carrier surface 49'.

The cooling surface 14' of the crystal 12' is also shaped accordingly so that a reflector layer 16 which abuts on the carrier surface 49' over its entire surface again abuts on the cooling surface 14' over its entire surface with, for its part, an essentially constant thickness.

In the same way, the surface 22' located opposite the cooling surface 14' is, in this case, also concave in shape so that the crystal 12 has a constant thickness D.

Figure 14:
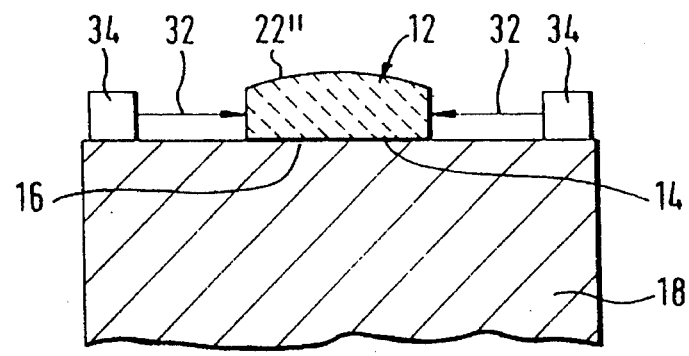
FIG. 14 is an additional variation of the first embodiment relating to the shape of the crystal in an illustration similar to FIG. 1.

Alternatively thereto, the crystal 12 of another variation of the inventive solution, a detail of which is illustrated in FIG. 14, is itself provided with a convex surface 22" which acts as a crystal lens. As for the rest, the cooling surface 14 is a plane surface in the same way as in the basic variation of the first embodiment illustrated, for example, in FIGS. 1 to 3.

Figure 15:
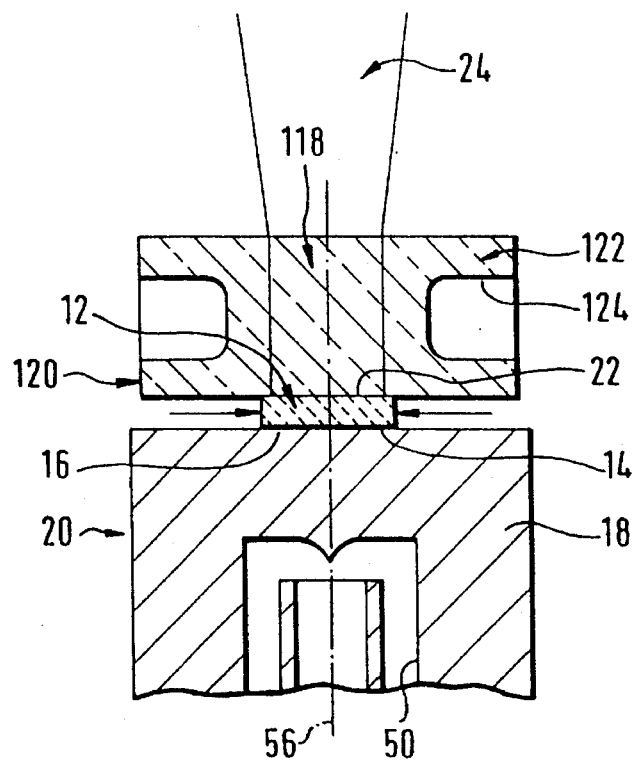
FIG. 15 is an additional variation of the first embodiment relating to the cooling of the crystal in an illustration similar to FIG. 1.

An additional, even more efficient cooling can be achieved in a further variation of the first embodiment, illustrated in FIG. 15, in that an additional cooling element 120 is seated on the surface 22. This cooling element is, for its part, made from a material which is transparent and has a high heat conductivity, such as, for example, silicon carbide, and has in the center a region 118 penetrated by the laser radiation field 24. Adjacent this region are outer regions 122 which comprise recesses 124 penetrated by a cooling medium, preferably cooling water, so that heat is transported out of the material of the outer regions 122 via the cooling medium flowing through the recesses 124 and via these outer regions out of the central region 118 of the cooling element 120 penetrated by the laser radiation field 24. Alternatively, the transparent cooling element can be arranged in a ring which comprises the recess for the cooling medium.

In this case, the crystal 12 is arranged between the cooling element 120 and the cooling element 20, formed from the cooling body 18 and the reflector layer 16, and therefore cooled on both surfaces facing one another, i.e. the surface 22 and the cooling surface 14, while the pumping light 32 is coupled in via the side surfaces 30 in the known manner.

As for the rest, this variation is of the same design as the first embodiment according to FIGS. 1 and 2.

All the variations of the first embodiment are, moreover, identical to the first form and/or the first variation so that reference can be made in full to the comments in this respect.

Figure 16:
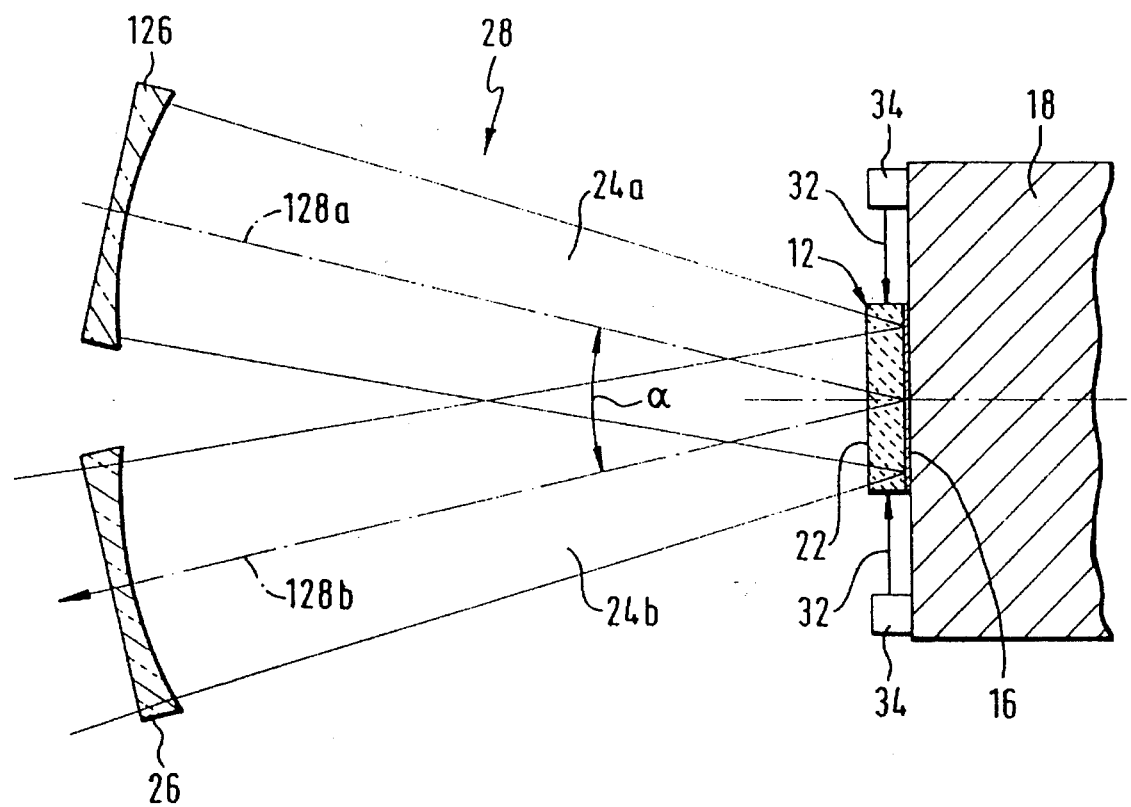
FIG. 16 shows a second embodiment of an inventive laser amplifying system as part of a laser system.

A second embodiment of an inventive laser amplifier, illustrated in FIG. 16, differs from the embodiment illustrated in FIG. 1 only in that the laser radiation field 24 represents that of a folded resonator and has two branches 24a and 24b, whereby the resonator 28 has an end mirror 126 which is preferably fully reflective. Proceeding from this end mirror 126, the branch 24a of the laser radiation field extends as far as the crystal 12, passes into the crystal through its surface 22 and is reflected at the reflector layer 16 in the form of the second branch 24b which impinges on the coupling-out mirror 26 and is partially reflected and partially passes through this mirror. The two branches 24a and 24b are inclined relative to one another at an acute angle α so that a resonator axis 128 also has two branches 128a and 128b which extend at an acute angle to one another.

The advantage of the second embodiment is to be seen in the fact that, in contrast to the first embodiment, no standing waves, which lead in the first embodiment to an irregular utilization of the excited crystal, can be formed in the direction 42 due to the folded resonator.

Figure 17:
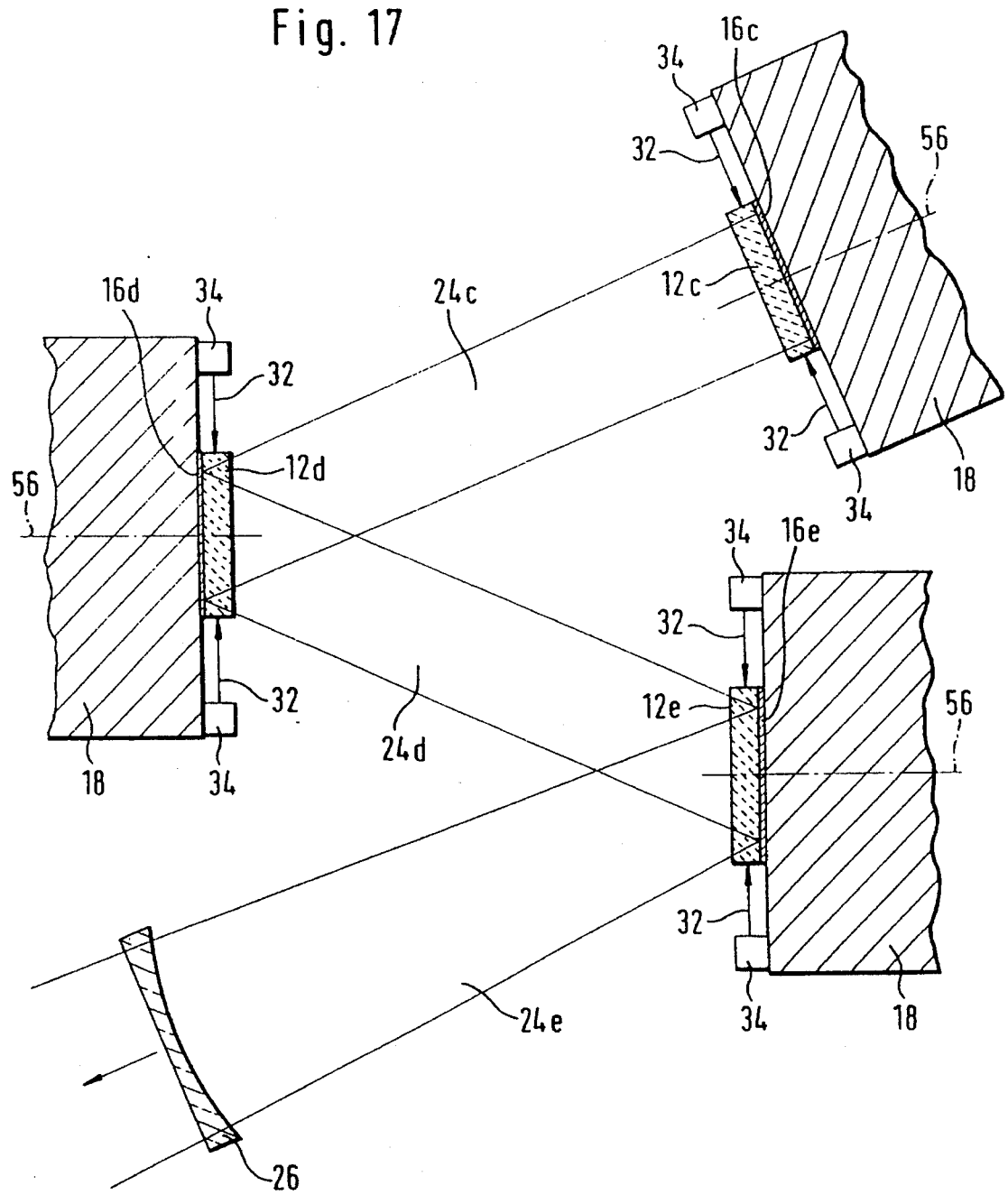
FIG. 17 shows a third embodiment of an inventive laser amplifying system as part of a laser system.

A third embodiment, illustrated in FIG. 17, comprises a laser amplifier likewise designed as a laser having a resonator folded several times, whereby the laser radiation field has a total of 3 branches 24c, 24d and 24e. In this respect, the branch 24c extends from a first reflector layer 16c with a crystal 12c seated thereon as far as a reflector layer 16d with a crystal 12d seated thereon. Proceeding from the reflector layer 16d, the second branch 24d extends as far as a reflector layer 16e with a crystal 12e seated thereon and from the reflector layer 16e the branch 24e of the laser radiation field 24 extends as far as the coupling-out mirror 26.

The crystals 12c, 12d and 12e are pumped and cooled in the same manner as that described in conjunction with the first embodiment in FIG. 1. In addition, all the variations described in conjunction with the first embodiment are also conceivable.

Figure 18:
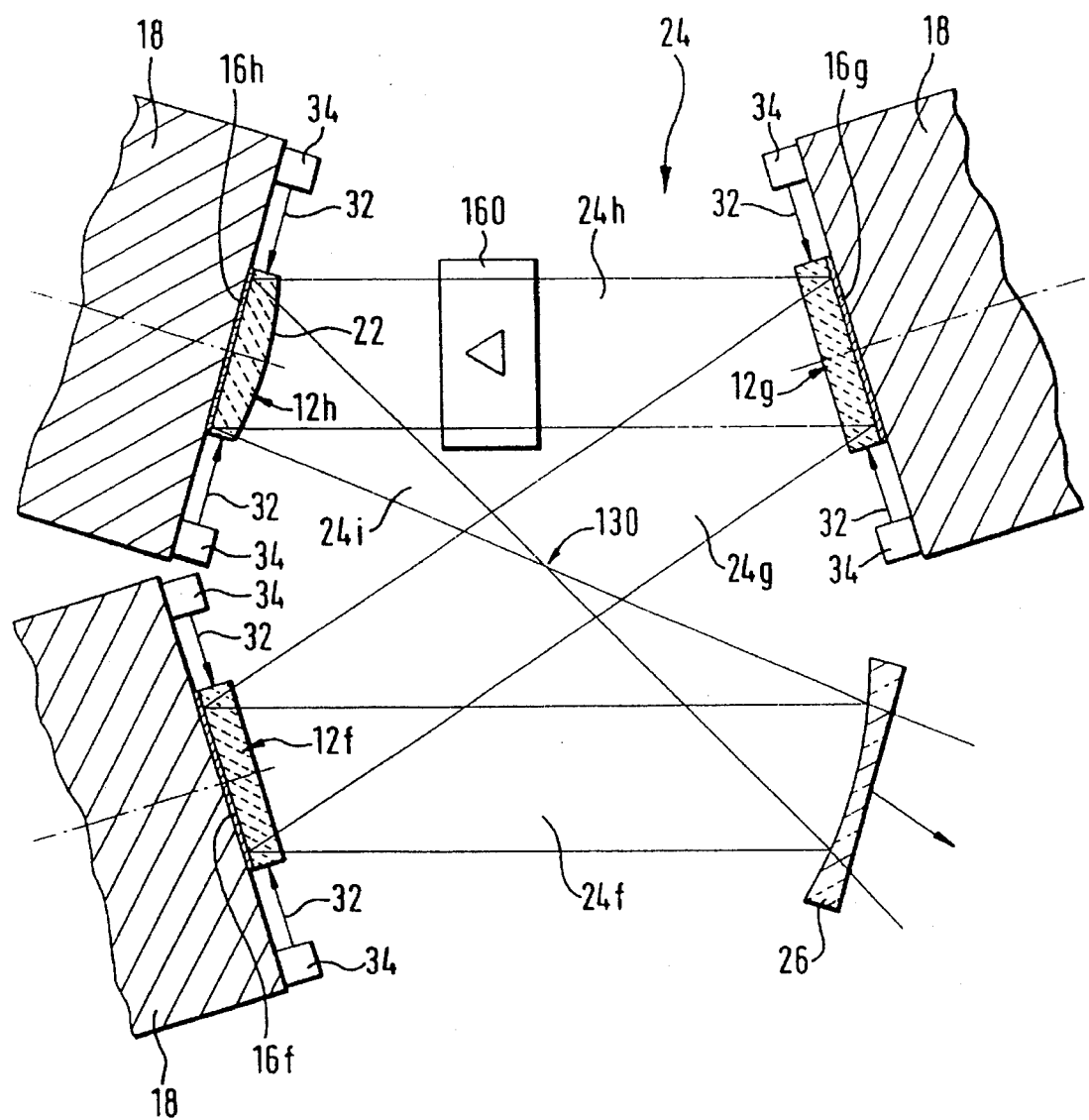
FIG. 18 shows a fourth embodiment of an inventive laser amplifying system as part of a laser system.

In a fourth embodiment, illustrated in FIG. 18, the laser radiation field 24 forms a ring resonator, the first branch 24f of which extends from the coupling-out mirror 26 as far as a reflector layer 16f with a crystal 12f seated thereon. From this reflector layer 16f a second branch 24g extends as far as a reflector layer 16g with a crystal 12g seated in front of it; from the reflector layer 16g a third branch 24h again extends as far as a reflector layer 16h with a crystal 12h seated in front of it, this crystal having a convex surface 22. The convex surface 22 leads to a focusing of a fourth branch 24i in a focus 130 and, following the focus 130, this fourth branch expands again and impinges on the coupling-out mirror 26.

In order to establish a well-defined radiation circuit in the laser radiation field 24 of the ring resonator, an optical diode 160 is provided which allows propagation of the radiation in the annularly closed laser radiation field 24 only in one direction.

Figure 19:
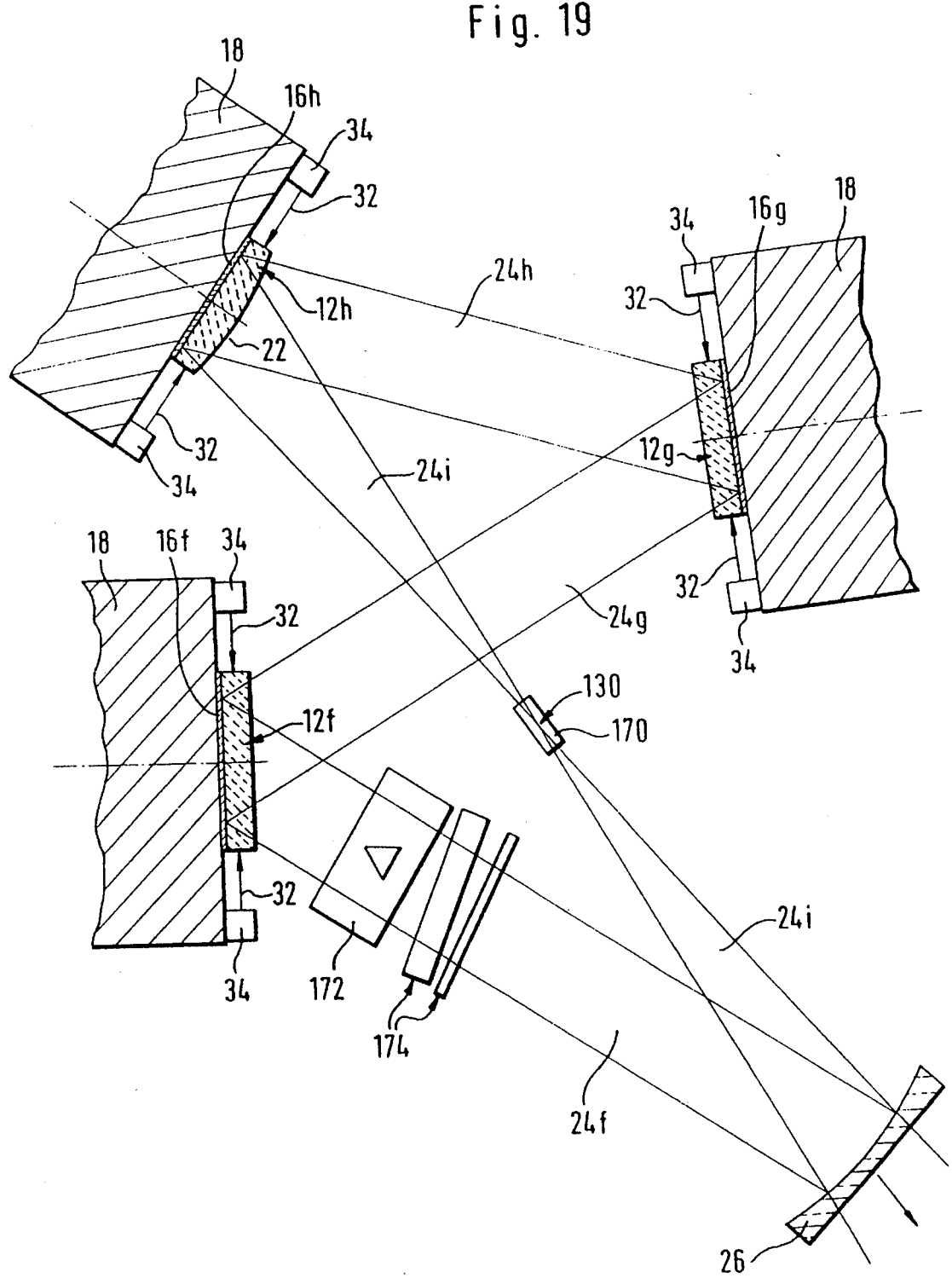
FIG. 19 shows a fifth embodiment of an inventive laser amplifying system as part of a laser system.

In a fifth embodiment, illustrated in FIG. 19, the construction is similar to that of the fourth embodiment with the difference that a doubler crystal 170 is arranged in the focus 130 so that the laser wavelength of the laser is halved. Furthermore, in addition to the optical diode 172, which is arranged in this embodiment in the branch 24f, an etalon 174 is provided which allows a narrowband frequency adjustment. This etalon is, for example, also provided in the branch 24f.

As for the rest, the concept is identical to that of the fourth embodiment according to FIG. 18 so that reference can be made in full to the comments in this respect.

Figure 20:
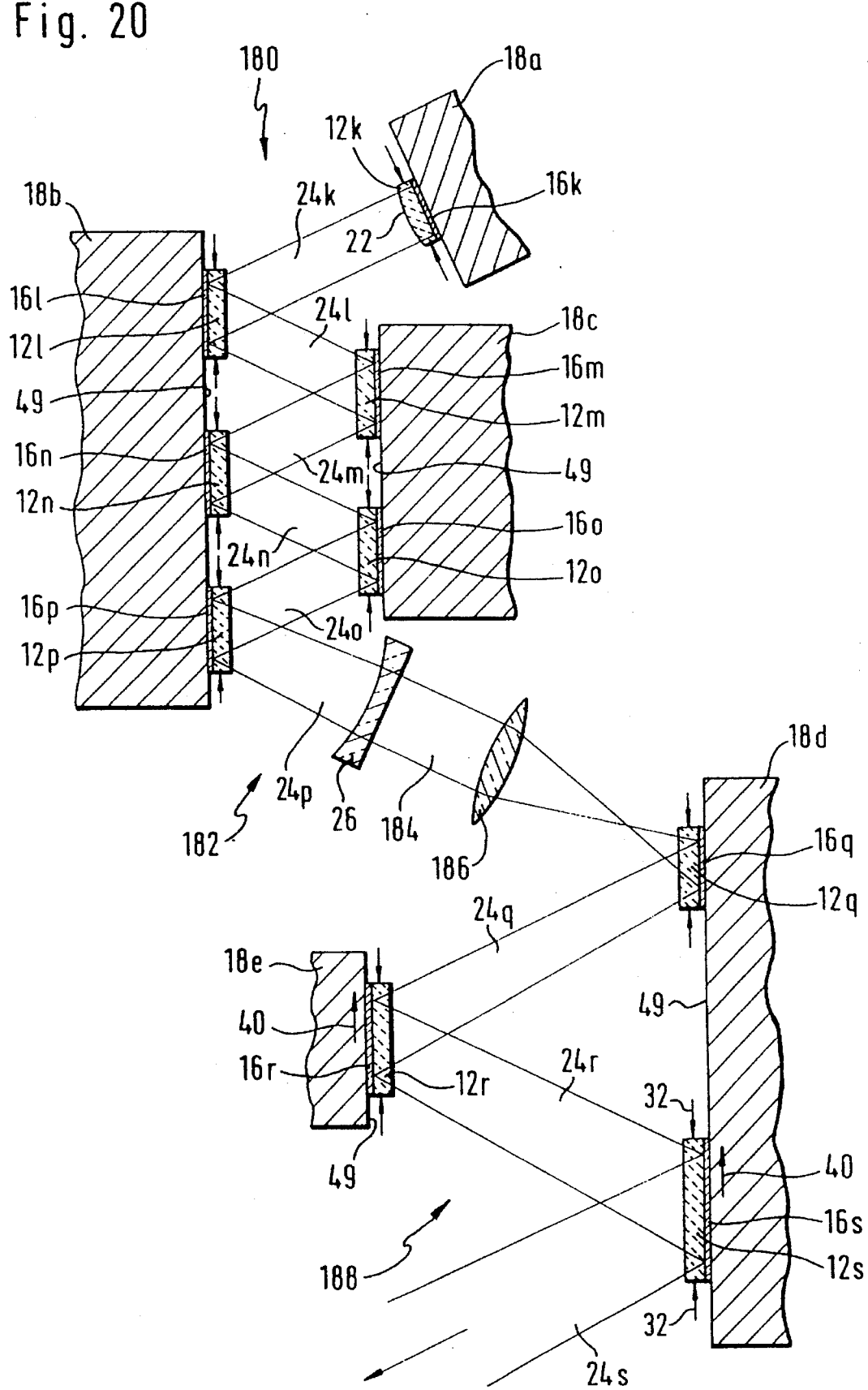
FIG. 20 shows a sixth embodiment of an inventive laser amplifying system comprising a system with a laser and a succeeding laser amplifier.

In a further embodiment of a laser system, illustrated in FIG. 20, two inventive laser amplifying systems are provided, namely one in a laser 180 having a resonator 182 which is formed by the coupling-out mirror 26 and a reflector layer 16k as end mirror. A crystal 12k with a convex surface 22 is seated on this reflector layer 16k.

Proceeding from the reflector layer 16k, a first branch 24k of the laser radiation field 24 extends as far as a reflector layer 16l, in front of which a crystal 12l is likewise seated. Proceeding from the reflector layer 16l a second branch 24l extends as far as a reflector layer 16m, in front of which a crystal 12m is likewise seated; from the reflector layer 16m a third branch 24m extends as far as a reflector layer 16n, in front of which a crystal 12n is seated. From the reflector layer 16n a fourth branch 24n extends as far as a reflector layer 16o, in front of which a crystal 12o is seated; from the reflector layer 16o a branch 24o extends as far as a reflector layer 16p, in front of which a crystal 12p is seated, and from the reflector layer 16p a branch 24p extends as far as the end mirror 26. All these elements together form the laser 180 which, in principle, corresponds to that of the third embodiment according to FIG. 17, whereby the end mirror 26 is a partially transparent coupling-out mirror.

An exiting laser beam 184 formed by the laser radiation field 24 passing through the coupling-out mirror 26 is reflected via a lens 186 onto a reflector layer 16q, in front of which a crystal 12q is seated. The reflector layer 16q again reflects with a slightly broadened branch 24q as far as a reflector layer 16r, in front of which a crystal 12r is seated, and this again with a branch 24r as far as a reflector layer 16s, in front of which a crystal 12s is seated. The reflector layer 16s again reflects into a branch 24s which, in the end, represents the exiting, divergent laser beam.

The reflector layers 16q to s and the crystals 12q to s thereby form a laser amplifier which is designated as a whole as 188 and further amplifies the laser beam 184. In this respect, the branches 24q to 24s diverge and, therefore, the reflector layers 16q to 16s and the crystals 12q to 12s have to be of larger dimensions with respect to their extension in the surface directions 40 and 44 in order to keep the power density in the crystals 12q to 12s approximately constant.

As in the preceding embodiments, the crystals 12k to 12s are pumped with pumping light 32 from pumping light sources 34 in accordance with a variation described in conjunction with the first embodiment.

Moreover, the reflector layers 16k to 16s are each seated, for their part, on a cooling body 18, whereby it is, for example, possible to arrange the respective reflector layers 16l, 16n and 16p on a single cooling body 18b and, in the same manner, to arrange the reflector layers 16m and 16o also on a single cooling body 18c.

In the simplest case, the carrier surfaces 49 of the cooling bodies are aligned parallel to one another and have plane surfaces.

In the same way, the reflector surfaces 16q and 16s of the laser amplifier according to FIG. 20 are also arranged on a single cooling body 18d and extend parallel to the reflector surface 16r, whereby all the reflector surfaces 16q to 16s are plane surfaces.

Figure 21:
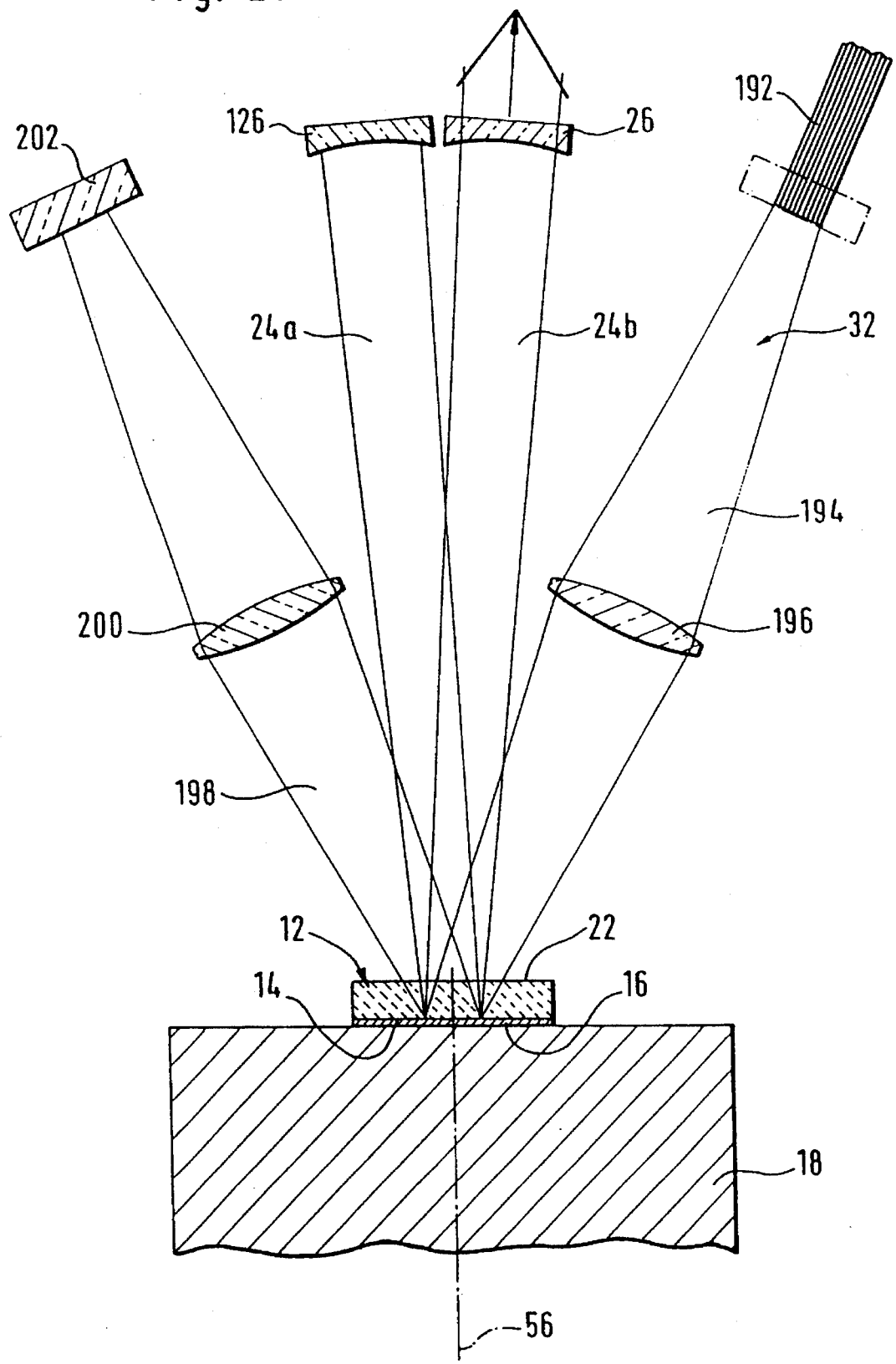
FIG. 21 shows a seventh embodiment of an inventive laser amplifying system as laser system.

In a further embodiment, illustrated in FIG. 21, the arrangement of the crystal 12 on the cooling body 18 with the reflector layer 16 is selected to be the same as in the second embodiment illustrated in FIG. 16.

In contrast to the second embodiment, the crystal 12 is, however, supplied with pumping light 32 likewise via the surface 22, whereby, for example, a pumping light beam 194 exiting from a bundle of fibers 190 is focused onto the crystal 12 by means of a lens 196, thereby enters the crystal 12 through the surface 22 at an acute angle in relation to the axis 56, is reflected by the reflector layer 16 and exits with a corresponding acute angle from the surface in the form of an exiting beam 198. This beam is, for its part, again focused via a lens 200 onto a re-reflecting mirror 202 which reflects the entire beam back again so that it is ensured that the pumping light 32 passes several times through the crystal in order to pump the crystal 12 effectively and as homogeneously as possible, namely approximately parallel to the direction 42, in the volume area penetrated by the laser radiation field.

In order to pump, in particular, the volume area of the crystal 12 penetrated by the laser radiation field 24 to a full extent, the angle relative to the axis 56, with which the pumping light beam 194 enters the crystal 12, is, in addition, greater than the angle, with which the laser radiation field 24 is inclined in relation to the axis 56.

As for the rest, the seventh embodiment illustrated in FIG. 21 is designed in the same way as the preceding embodiments and so reference can be made in full to the comments on these embodiments.

Figure 22:
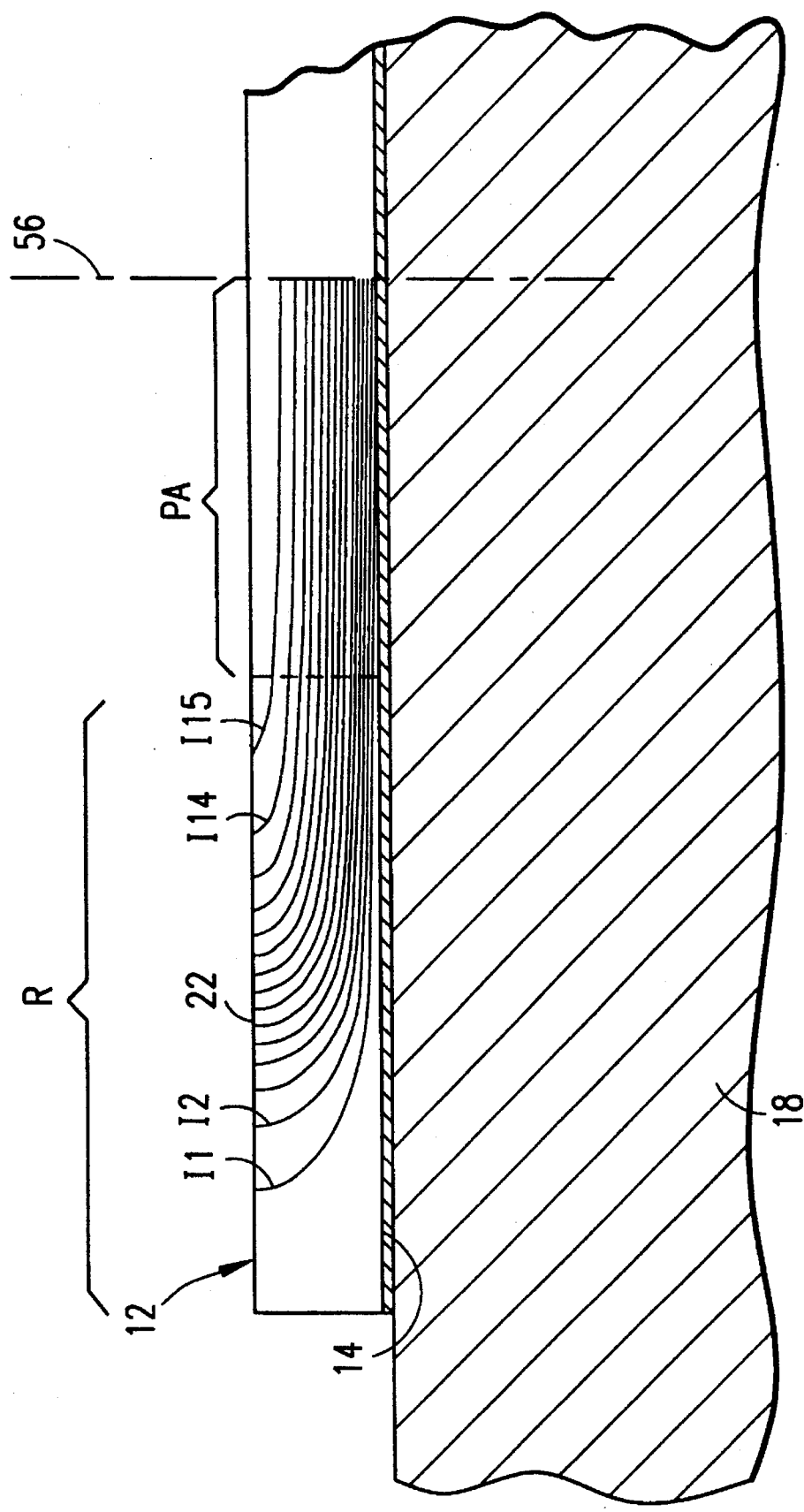
FIG. 22 is a schematic illustration of isothermal lines in the solid body according to the seventh embodiment.

When looking at the course followed by isothermal lines I, i.e. lines each having the same temperature, in the crystal 12, as illustrated in FIG. 22, it is apparent in the seventh embodiment that the isothermal lines I extend in a region PA excited by the pumping light 32 parallel to one another and parallel to the cooling surface 14. However, in a region R which is, in a radial direction in relation to the axis 56, located outside the region PA excited by the pumping light 32, the isothermal lines I (in FIG. 22), i.e. the isothermal lines I1 to I15, whereby I1<I15, bend away from the cooling surface 14, extend in the direction of the surface 22 and impinge on the surface 22 at a preferably acute angle.

It is apparent from this that the isothermal lines I1 to I15 lead in the radially outward lying region R to a temperature gradient extending parallel to the surface 22 and therefore to thermal stresses in the solid body 12 which, depending on the material composition of the solid body 12, can lead to the solid body breaking due to thermal stresses, in particular since no temperature gradient occurs near to the cooling surface 14 in the direction thereof.

Figure 23:
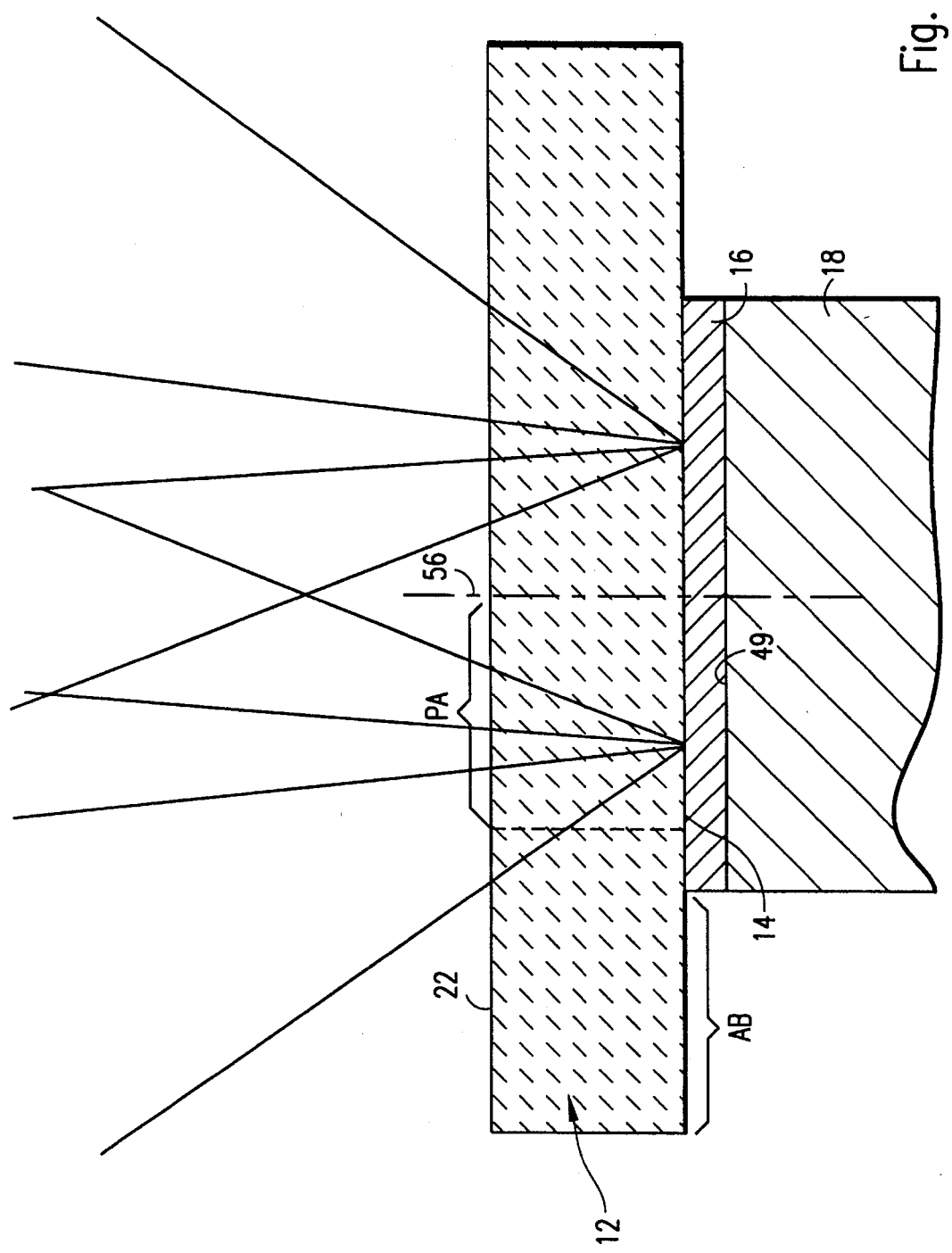
FIG. 23 is a first variation of the seventh embodiment.

To avoid or reduce such a unidirectional temperature gradient forming parallel to the surface 22, the solid body is, as illustrated in FIG. 23, designed such that it extends beyond the cooling surface 14 in radial direction relative to the axis 56 with an outer region AB and is not cooled in this outer region AB.

On the side located opposite the surface 22 the cooling surface 14 preferably extends slightly beyond the region PA excited by the pumping light 32 in radial direction relative to the axis 56 so that the radius of the cooling surface 14 relative to the axis 56 is greater than that of the region PA excited by the pumping light.

The isothermal lines I'1 to I'15, with I'1<I'15, resulting for this variation of the seventh embodiment extend, in the same way as in the basic form of the seventh embodiment, parallel to one another within the region PA excited by the pumping light. Due to the outwardly lying region AB of the solid body 12 the isothermal lines I'1 to I'7 bend in the direction of a surface 204 of the outer region AB, which is a continuation of the cooling surface 14 and located in the same plane, and extend at an acute angle to this surface. In addition, the isothermal lines I'8 to I'15 bend in the direction of the surface 22 and extend near to this surface in a direction parallel thereto.

As a result, a temperature gradient which is directed parallel to the surface 22 occurs near to this surface and also, parallel to the cooling surface 14 in the region of the surface 204, a gradient occurs which is directed parallel to this surface so that a unidirectional gradient, as in the basic form of the seventh embodiment, is avoided. This means that the thermal stresses in the solid body 12 according to the first variation of the seventh embodiment are distributed more uniformly than the thermal stresses in the solid body 12 of the basic form of the seventh embodiment.

Figure 24:
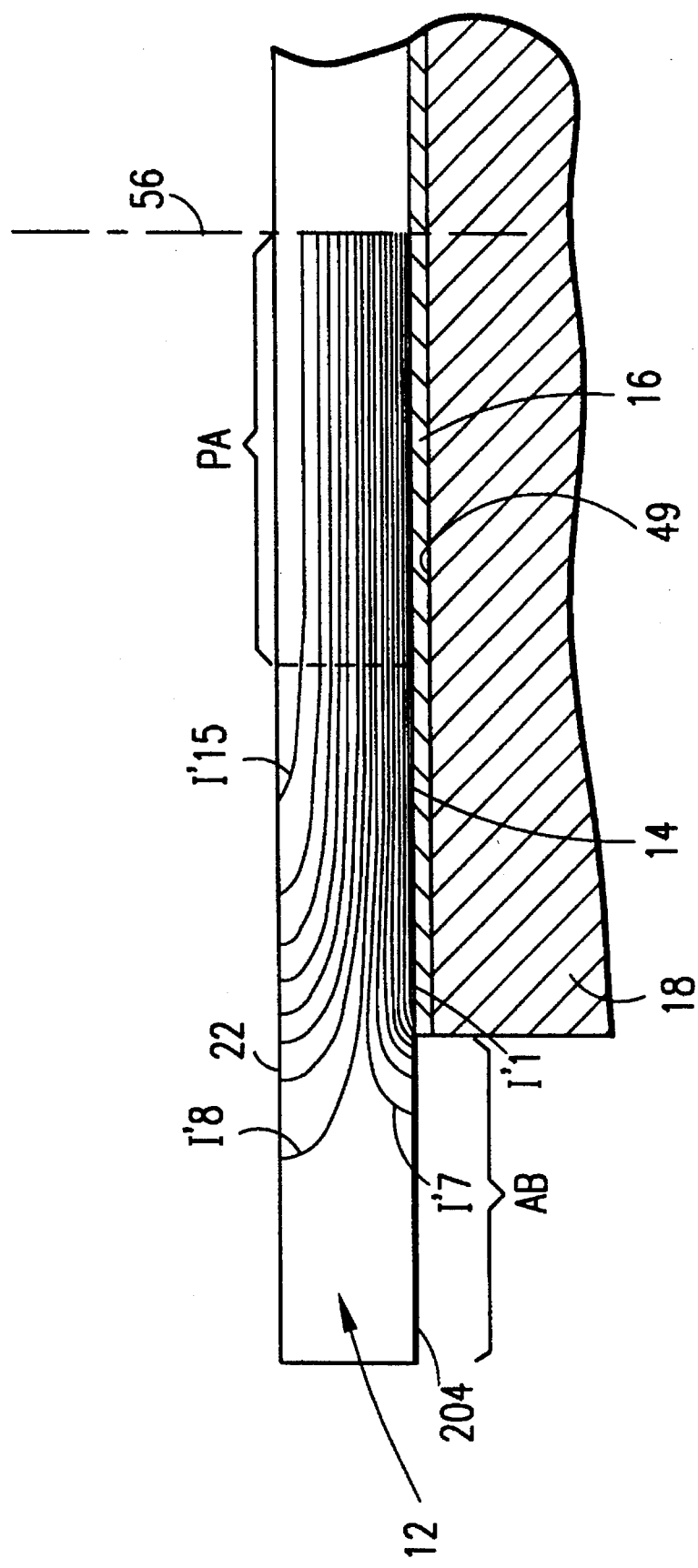
FIG. 24 is an illustration of isothermal lines in the first variation of the seventh embodiment.

It is possible to bring about such a more uniform distribution of the thermal stresses when, as illustrated in the first variation of the seventh embodiment in FIGS. 23 and 24, the cooling surface 14 rests on the reflector layer 16 but the solid body 12 extends beyond this in radial direction relative to the axis 56. In addition, the reflector layer 16 extends over the entire carrier surface 49 of the cooling body 18.

Figure 25:
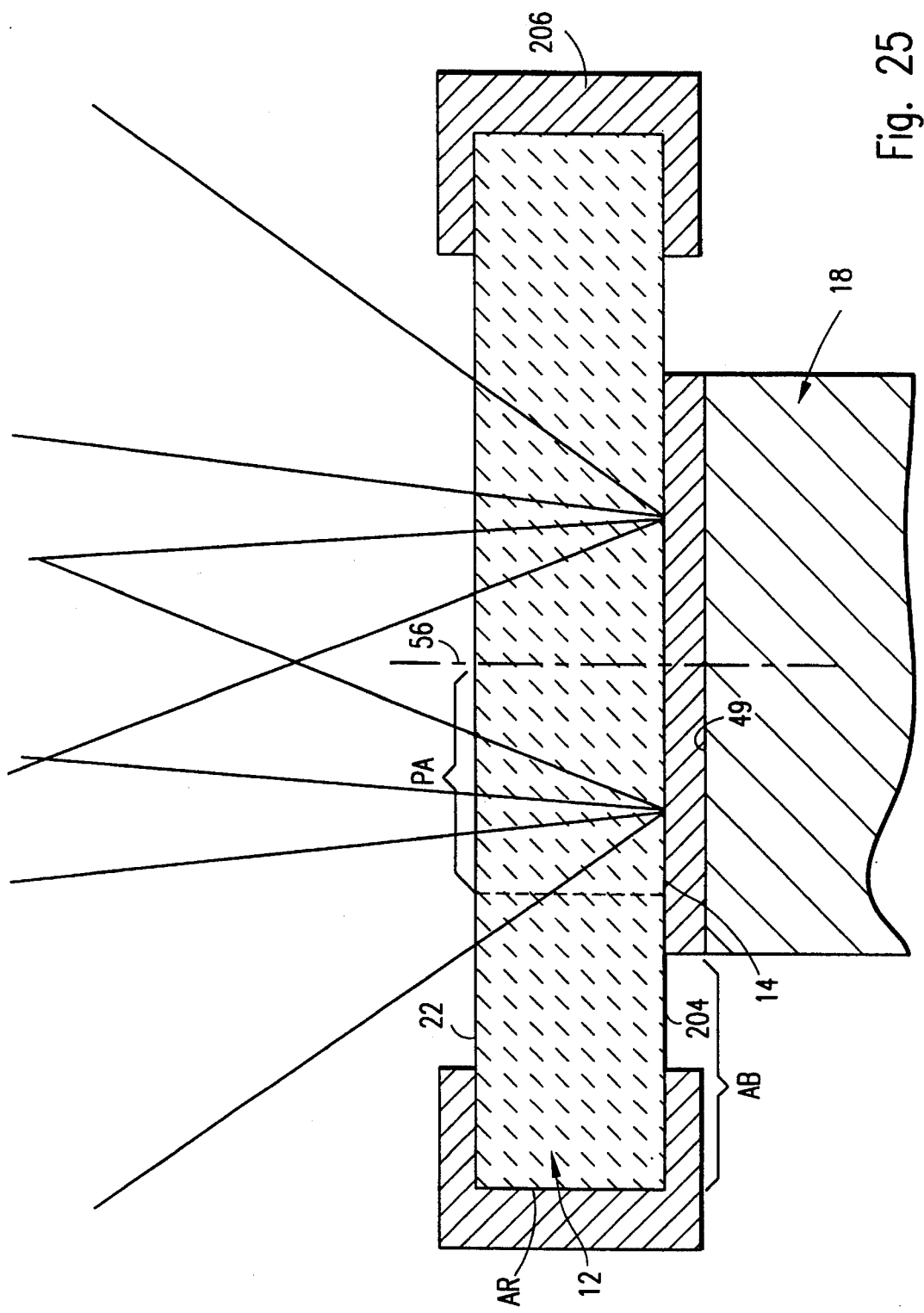
FIG. 25 is a schematic illustration of a second variation of the seventh embodiment similar to FIG. 21.

In a second variation of the seventh embodiment, illustrated in FIG. 25, the cooling body 18 is designed exactly as in the first variation and extends with the outer region AB beyond the cooling surface 14.

In order, however, to achieve an even better balancing of thermal stresses, the solid body 12 is surrounded in the region of its outer edge AR by an attemperating ring 206 which supplies the solid body 12 with thermal energy in the region of its outer edge AR and therefore heats the solid body in the region of its outer edge AR so that the isothermal lines I' follow a course reaching as far as the outer edge AR.

The attemperating ring 206 is, for example, preheated by a heating element to a temperature which is in the range of the temperature of the isothermal lines I'7 and I'8 so that these extend as far as the outer edge AR and, at the same time, the temperature gradient between I'1 and I'7 as well as I'8 and I'15 is thereby reduced.

The solid body can also be heated by way of radiation of the regions to be heated, for example with light well absorbed by the solid body.

The thermal stresses can be avoided even more advantageously when the attemperating ring 206 heats the surface 22 to a greater extent than the surface 204 and, in particular, maintains the surface 204 at a temperature which is approximately in the range of the temperature of the cooling body 18.

In this respect, it is also possible to cool the solid body 12 with the cooling surface 14 over the entire surface and only heat it on the surface 22 in the region of the outer edge AR.

Figure 26:
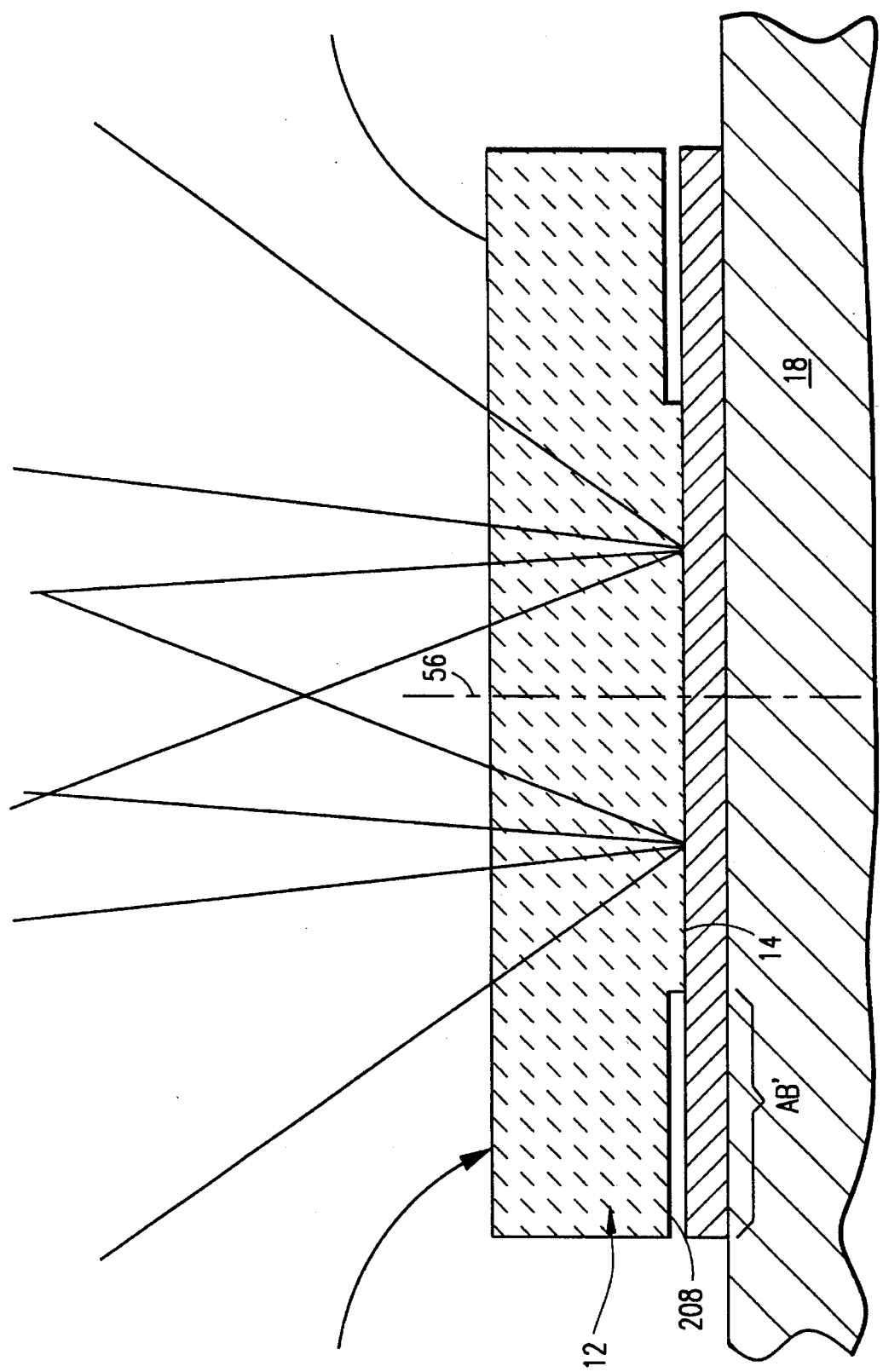
FIG. 26 is a third variation of the seventh embodiment, illustrated similar to FIG. 21.

Alternatively to the second variation of the seventh embodiment, the solid body 12 of a third variation, illustrated in FIG. 26, is provided in relation to the axis 56 radially beyond the cooling surface 14 with a step 208 which is set back in relation to the cooling surface 14 so that the solid body 12 also has an outer region AB' which is not in direct bodily heat contact with the cooling body 18 and can therefore be heated to higher temperatures. This means that it is also possible for the isothermal lines to follow a course which is similar to that illustrated in FIG. 24 in conjunction with the first variation.

Figure 27:
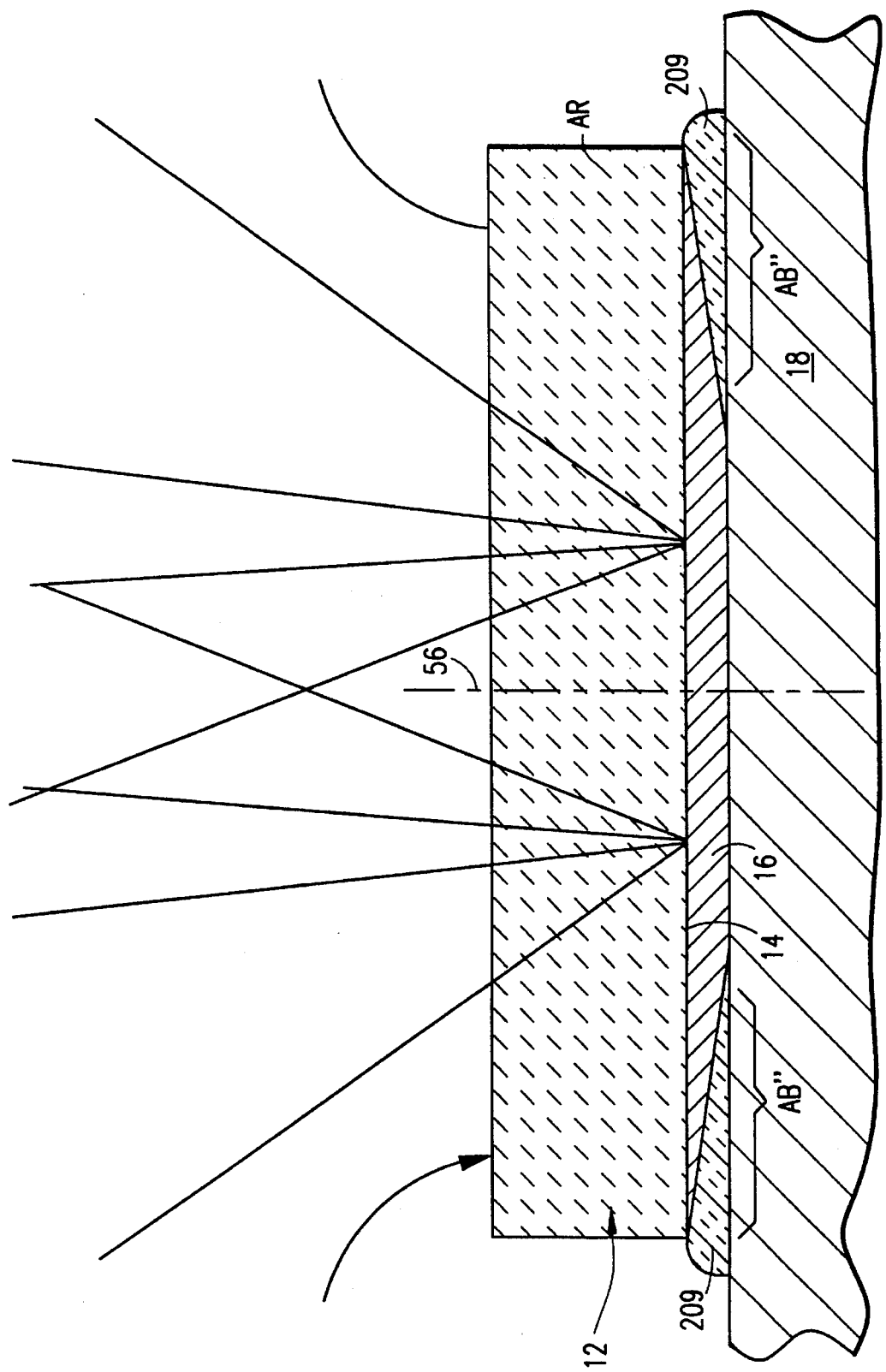
FIG. 27 is a fourth variation of the seventh embodiment, illustrated similar to FIG. 21.

In a fourth variation of the seventh embodiment, illustrated in FIG. 27, the cooling surface 14 which is thermally coupled bodily to the cooling body 18 directly and transversely via the reflector layer 16 is reduced in that the thickness of the reflector layer 16 is decreased in a region AB" located radially outwards in relation to the axis 56. This results in a gap 209 which widens towards the outer edge AR of the solid body 12 and is filled with a medium which is not as good a thermal conductor as the reflector layer so that the cooling capacity acting on the solid body 12 from the cooling body 18 continuously decreases in the outer region AB" with increasing distance from the axis 56 as far as the outer edge AR and therefore it is likewise possible to heat the solid body 12 in the outer region AB". This, again, results in the isothermal lines extending more uniformly and a temperature gradient extending parallel to the surface 22 is either of a lesser amount than that of the basic form of the seventh embodiment or is not unidirectional but behaves in a similar manner to the temperature gradient forming in FIG. 24 in the first variation of the seventh embodiment and directed parallel to the surface 22 or parallel to the cooling surface 14. Alternatively, it is also possible to leave the thickness of the reflector layer unchanged and provide corresponding recesses in the cooling body 18 for the widening gap 209 in the region of the outer edge AR.

Figure 28:
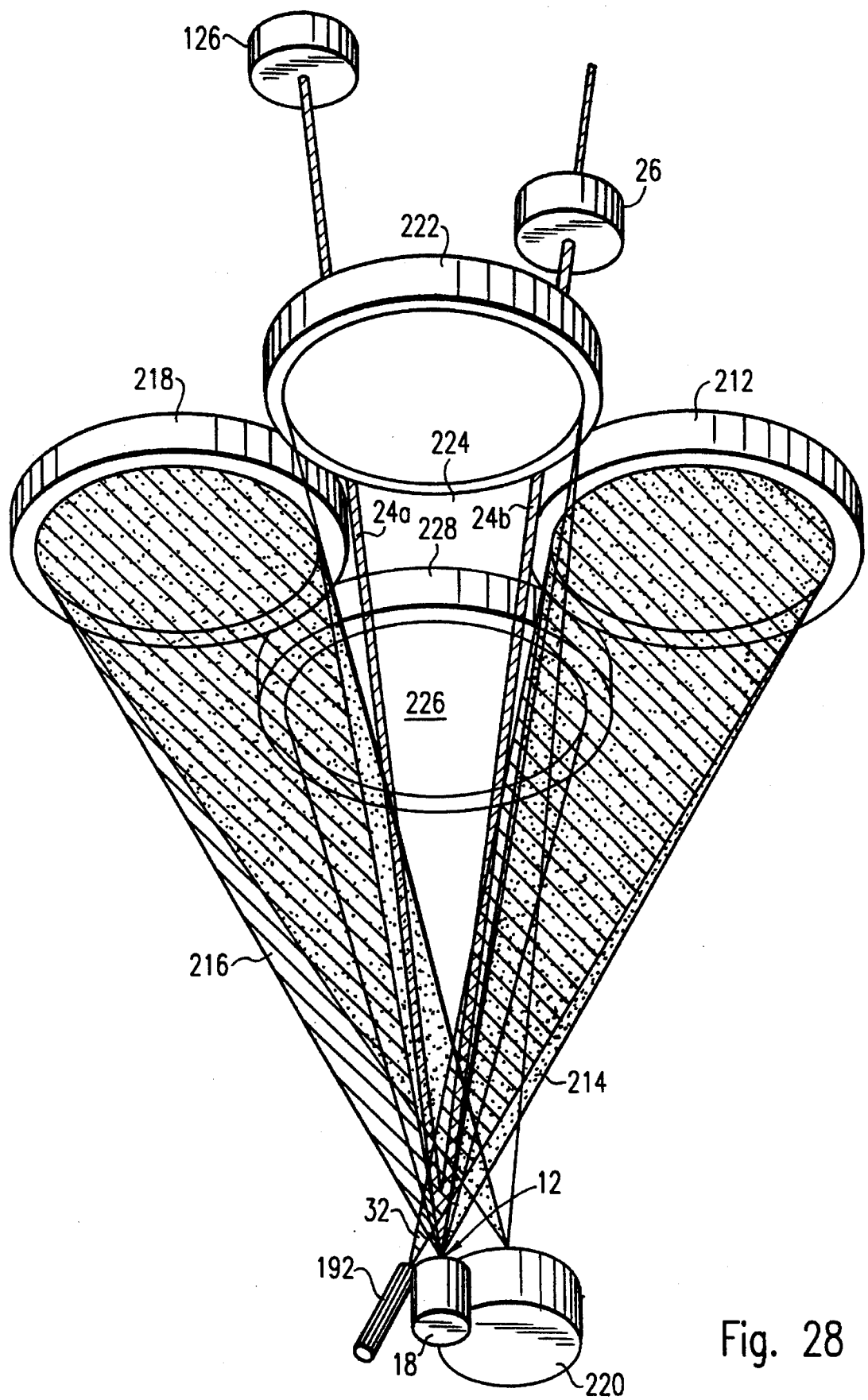
FIG. 28 is an eighth embodiment of an inventive laser amplifying system as laser system in a schematic illustration of the optical components.

In an eighth embodiment, illustrated in FIG. 28, the construction is, in principle, comparable to that of the seventh embodiment according to FIG. 21 but a more effective excitation of the solid body 12 is possible in this case.

As in the seventh embodiment, pumping light 32 exits from the bundle of fibers 192. This pumping light first impinges on a first pumping light mirror 212, from this first pumping light mirror 212 the pumping light 32 is reflected onto the solid body 12 in the form of a pumping light beam 214, penetrates the solid body 12 as far as the reflector layer 16 between the solid body 12 and the cooling body 18 and is reflected by the reflector layer 16 in the form of an exiting beam 216 onto a second pumping light mirror 218. This mirror causes the exiting beam 216 to impinge on an auxiliary mirror 220 which, for its part, reflects this exiting beam 216 onto a third pumping light mirror 222 which then, for its part, again reflects the pumping light in the form of an incoming beam 224 onto the solid body such that this pumping light penetrates the solid body and is reflected by the reflector layer 16 in the form of an exiting beam 226 onto a fourth pumping light mirror 228. This mirror reflects the exiting beam 226 back into itself again so that this beam again enters the solid body 12, penetrates this solid body, is reflected by the reflector layer back to the third pumping light mirror 222, from this to the middle mirror 220, from this to the second pumping light mirror 218, from the latter again back to the solid body 12 and from the reflector layer 16 again back to the first pumping light mirror 212.

It is therefore possible with this eighth embodiment to irradiate the solid body 12 eight times and thus attain an optimum utilization of the pumping light 32 exiting from the bundle of fibers 192.

As for the rest, the eighth embodiment can likewise be developed further in accordance with the variations described in conjunction with the seventh embodiment.

Figure 29:
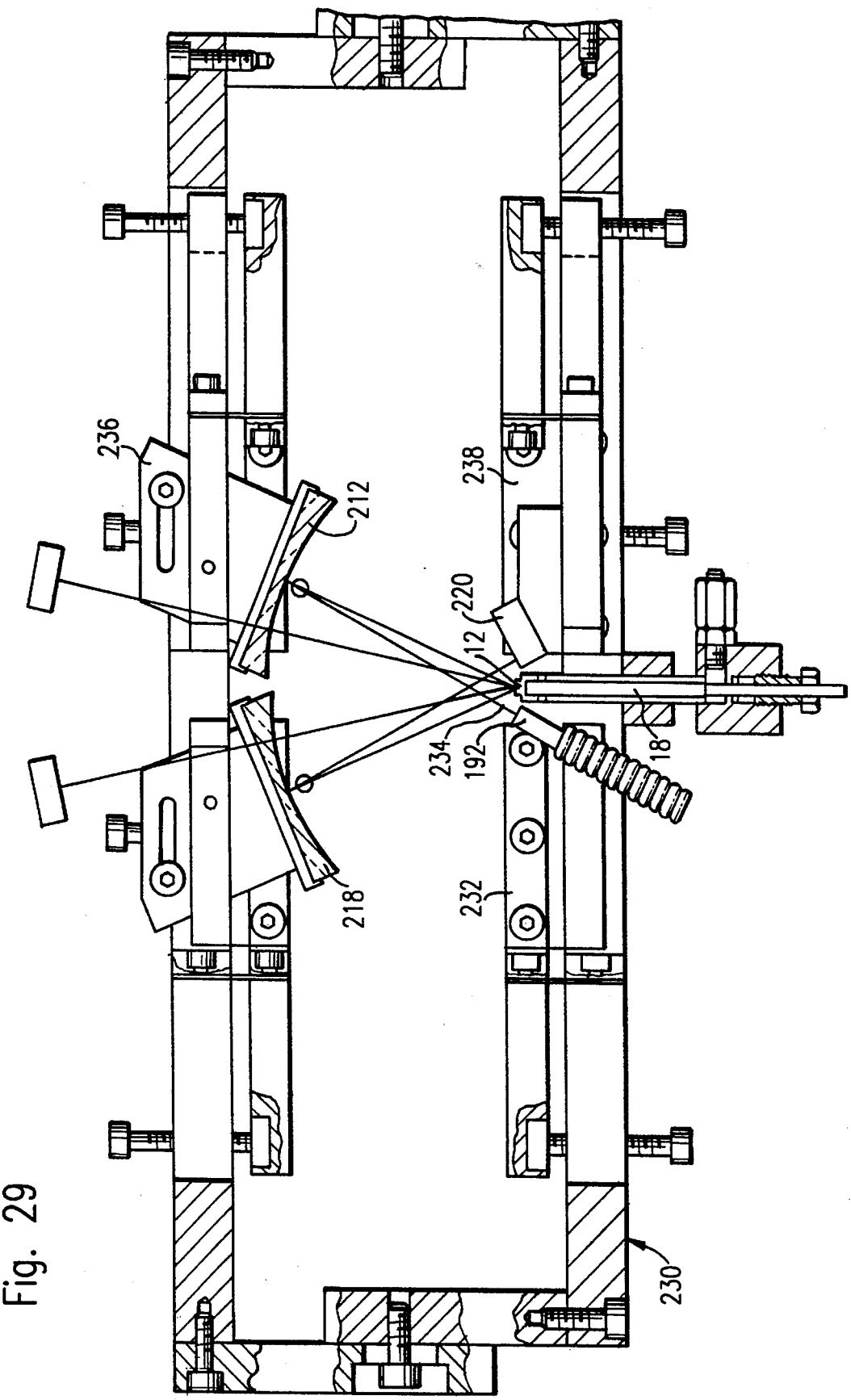
FIG. 29 is a sectional illustration through a construction of the eighth embodiment according to FIG. 28.

The mechanical construction of the eighth embodiment illustrated in FIG. 28 comprises, as illustrated in the partial section in FIG. 29, a housing 230, on which an adjustable holder 232 for the bundle of fibers 192 is held so that a beam direction 234 of the pumping light 32 exiting from the bundle of fibers 192 is adjustable.

In addition, an adjustable holder 236 for each of the pumping light mirrors 212, 218, 222 and 228 is respectively held on the housing 230. With these adjustable holders 236, the pumping light mirrors 212, 218, 222, 228 are adjustable such that the course followed by the beam as described in conjunction with FIG. 28 results, whereby the auxiliary mirror 220 is, for its part, also seated on an adjustable holder 238 and therefore likewise adjustable in relation to the housing 230.

The solid body 12 seated on the cooling body 18 is not adjustable in relation to the housing 230. Rather, the entire course of the beam is adjusted relative to this solid body 12 with the individual holders 232, 236 and 238.

In addition, a folded laser resonator is also provided in the eighth embodiment. This laser resonator comprises, in exactly the same way as in the seventh embodiment, the two end mirrors 26 and 126 and forms a laser radiation field 24 which is formed from the two branches 24a and 24b as a folded laser radiation field.

As already described in the seventh embodiment, this laser radiation field 24 penetrates the solid body 12 four times in order to obtain a coupling-in which is as effective as possible.

Figure 30:
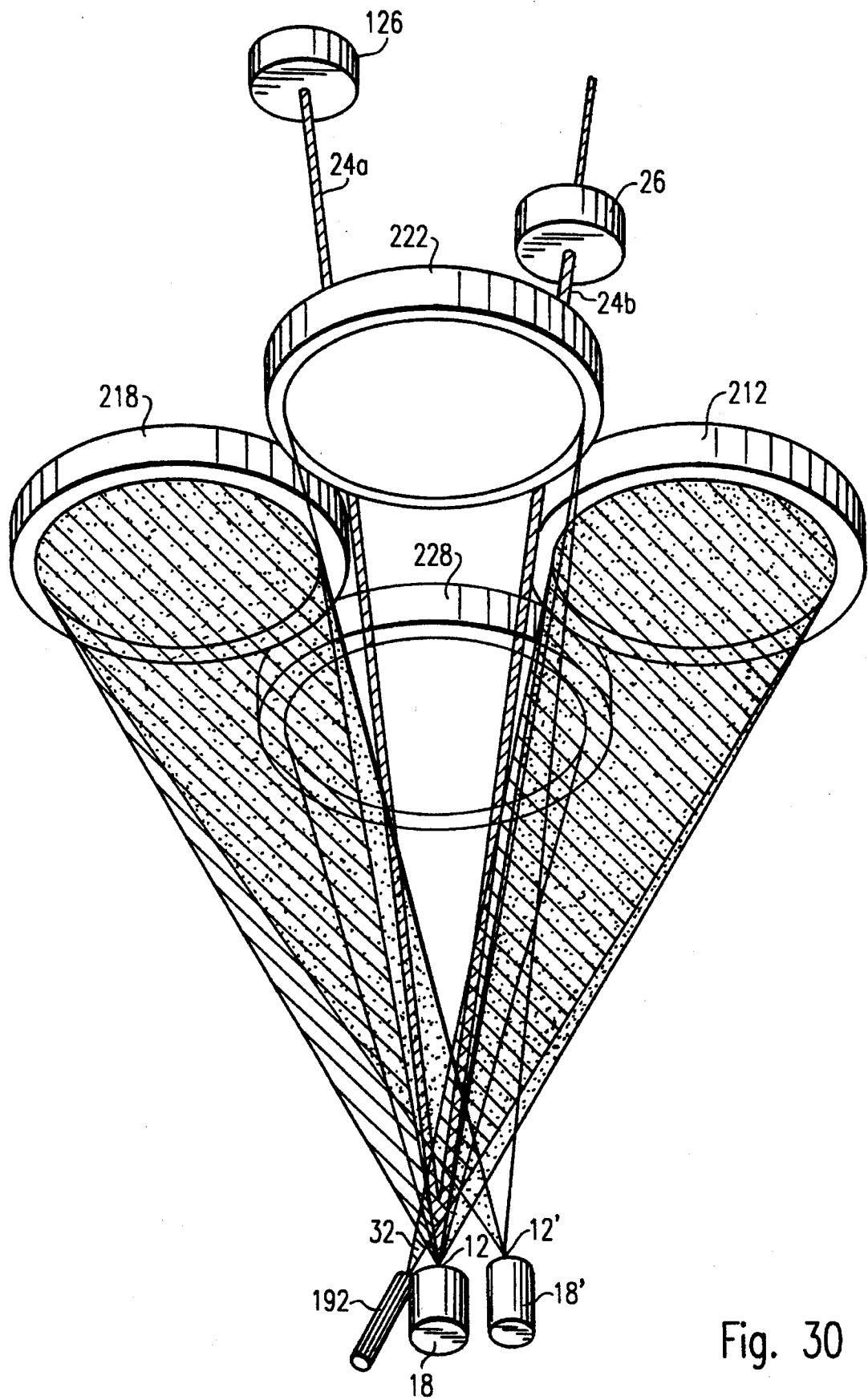
FIG. 30 is an illustration of a ninth embodiment of an inventive laser amplifying system as laser system similar to FIG. 28.

In a ninth embodiment, illustrated in FIG. 30, the construction corresponds essentially to that of the eighth embodiment according to FIG. 28, with the difference that instead of the auxiliary mirror 220 an additional solid body 12' with a reflector layer 16' not illustrated in the drawing is provided. This solid body is seated on a cooling body 18' so that with the same pumping light 32 exiting from the bundle of fibers 192 it is possible to excite two solid bodies 12 and 12' which then both act as lasers. For reasons of clarity, FIG. 30 does not illustrate the resonator provided for the second solid body 12' with the corresponding radiation field 24 but this is constructed in the same manner as the resonator following the resonator radiation field 24a and 24b and having the mirrors 26 and 126.

As for the rest, the ninth embodiment is designed in the same manner as the eighth embodiment and so reference can be made in full to this embodiment.

Figure 31:
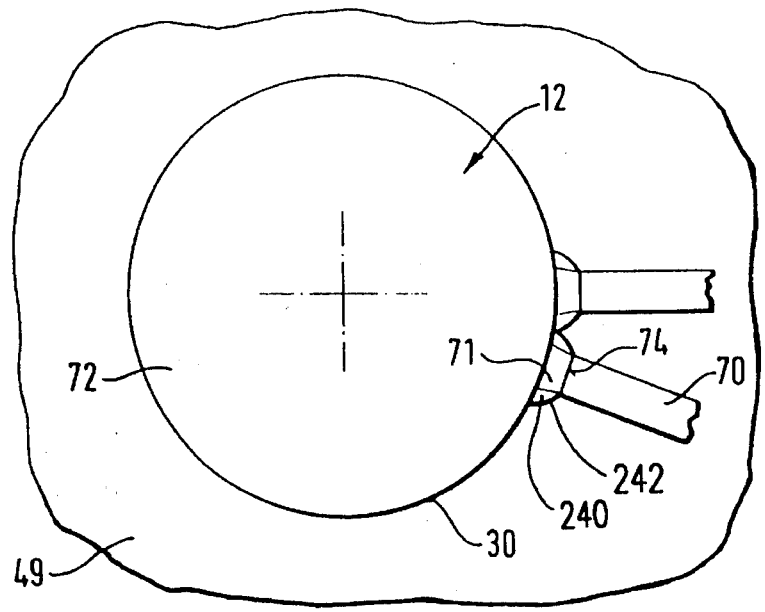
FIG. 31 is an illustration of a tenth embodiment of an inventive laser system as laser amplifying system in a plan view similar to FIG. 4.

In a tenth embodiment, schematically illustrated in FIG. 31, a material 240 adapting the refractive index is provided between the end 74 of the respective light guide 70 near the crystal and the side surface 30 of the crystal 12. This material has a refractive index which is between that of the light guide 70 and of the crystal 12.

With this material 240 adapting the refractive index the divergence of the cone 71 of the pumping light 32 exiting from the end near the crystal can, on the one hand, be limited and, on the other hand, as a result of the material 240 adapting the refractive index no pumping light radiation reflecting on the side surfaces 30 can occur in the plane 72, as could, for example, be the case in the preceding embodiments, since the pumping light radiation can no longer be reflected by total reflection at the regions of the side surfaces, at which the material 240 adapting the refractive index abuts thereon, but penetrates the material 240 adapting the refractive index and can merely be reflected at its outer surfaces 242 facing the surroundings. This means that there is also no longer any possibility of having a circular reflection in the plane 72 and, therefore, of any formation of an undesired laser radiation field in this plane, which can be the case in the preceding embodiments.

As for the rest, reference is made to the comments on the first embodiment with respect to the additional features of the tenth embodiment.

Figure 32:
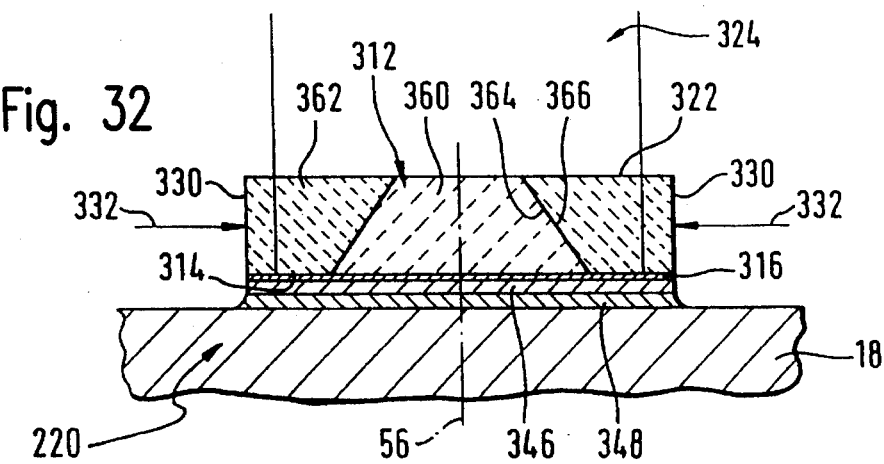
FIG. 32 is an eleventh embodiment of an inventive laser amplifying system, illustrated in a sectional illustration.

In an eleventh embodiment, schematically illustrated in FIG. 32, the crystal 312 is arranged on the cooling element 220 in the same way as in the first embodiment.

The laser radiation field 324 passes through the surface 322 in the same way as in the first embodiment and is reflected by the reflector layer 316.

The pumping light 332 is likewise coupled in via two side surfaces 330 located opposite one another.

In contrast to the first embodiment, the crystal 312 comprises an inner region 360 which is doped with the laser-active substance and an outer region 362 which is laser-inactive and non-absorbent for the laser radiation. Both regions have, in particular, the same thermal and optical properties.

The outer region 362 is, for example, bonded with its inner surface 364 to an outer surface 366 of the inner region 360 so that a gap-free transition exists between the inner region 360 and the outer region 362.

In addition, the inner surface 364 and the outer surface 366 preferably extend at the Brewster angle to the cooling surface 314 of the crystal 312.

The laser radiation field 324 penetrates not only the inner region 360 but also at least part of the outer region 362 which results in a better mode structure during use of the inventive laser amplifying system in a resonator of a laser system.

Furthermore, the subdivision of the crystal 312 into an inner region 360 and an outer region 362 offers the additional possibility of suppressing laser radiation forming in the plane 72 by reflection.

As for the rest, the crystal 312 of the tenth embodiment can be used in all the preceding embodiments instead of the crystal 12.

For this reason, all the comments made in conjunction with the first ten embodiments also apply to the eleventh embodiment. In a variation of the eleventh embodiment, illustrated in FIG. 33, the side surfaces 330' are inclined relative to the cooling surface 314 and represent reflection surfaces for pumping light 332' introduced laterally of, for example at right angles to the cooling surface and next to it. This pumping light 332' enters the outer region 362 from an underside 368 of the outer region 362 of the crystal 312, this underside being arranged in continuation of the cooling surface 314, and is reflected at the side surfaces 330' in the direction of the inner region 360. In this respect, the pumping light 332 likewise propagates in the crystal 312, as described, for example, in conjunction with the second embodiment, by way of total reflection at the surface 322 and the cooling surface 314 and, in part, the underside 368 and thereby penetrates the laser-active inner region 360 such that the laser-active atoms or molecules of this inner region 360 are pumped.

The advantage of this variation of the eleventh embodiment is to be seen in the fact that the pumping light 332' can essentially be supplied parallel to the axis 56 of the cooling body 18.

The laser radiation field 324 penetrates, in the same way as illustrated in FIG. 32, not only the inner region 360 but at least parts of the outer region 362 and is reflected at the reflecting layer 316.

Figure 33:
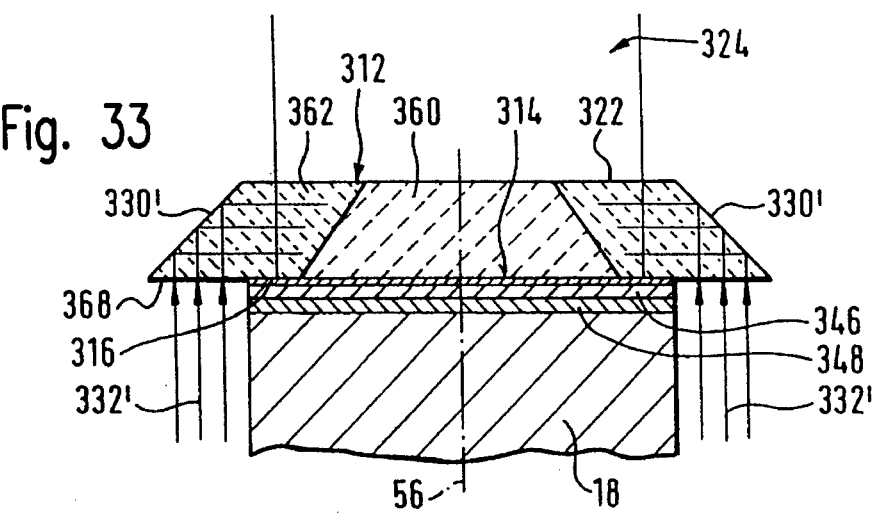
FIG. 33 is a variation of the eleventh embodiment according to FIG. 32.

This means that in the variation of the eleventh embodiment illustrated in FIG. 33 the possibility is created of realizing the inventive concept in radial direction relative to the axis 56 of the cooling body 18 in a space-saving manner.

Figure 34:
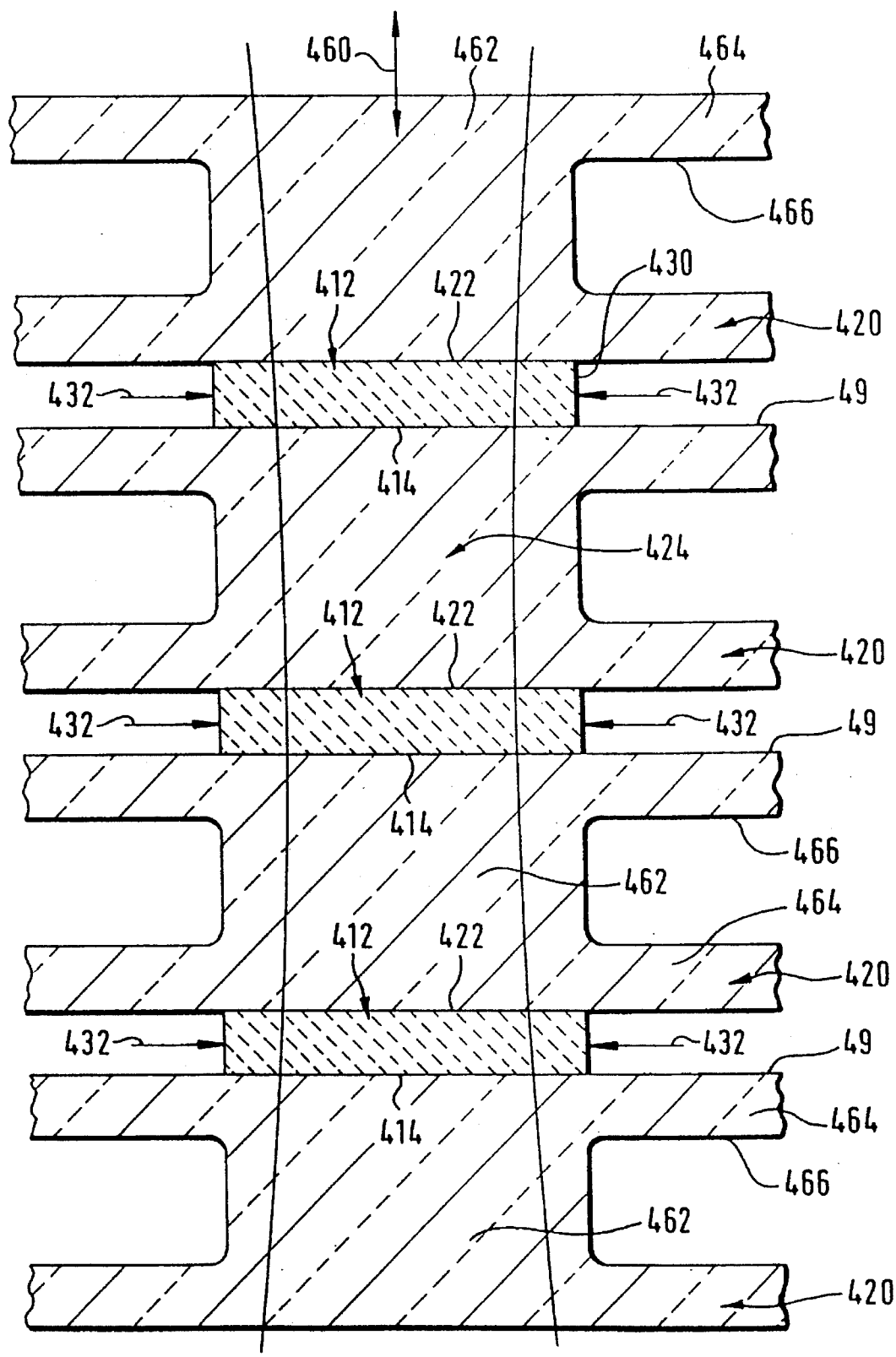
FIG. 34 is a twelfth embodiment of an inventive laser amplifying system.

In a twelfth embodiment, illustrated in FIG. 34, a plurality of crystals 412 are arranged with their cooling surfaces 414 parallel to one another and in spaced relationship, one cooling element 420 being arranged each time between two crystals 412. The cooling element abuts, on the one hand, on the cooling surface 414 of the one crystal 412 and, on the other hand, on the surface 422 of the other crystal so that the cooling elements 420 and the crystals 412 alternate with one another.

For this purpose, the cooling elements 420 are produced from a heat-conductive and transparent material, for example silicon carbide.

A laser radiation field 424 propagates in a direction towards the surfaces 414 and 422 which are all aligned parallel to one another.

The cooling elements 420 are homogeneously transparent in a central region 462 penetrated by the laser radiation field 424 and have recesses 466 for conducting cooling medium, for example cooling water, only in outer regions 464 laterally adjacent this central region.

Alternatively, the transparent cooling element can be arranged in a ring which comprises the recess for the cooling medium.

Futhermore, pumping light 432 is coupled in between the cooling elements 420 via the side surfaces 430 of the crystals 414 in accordance with any of the embodiments described above.

In the eleventh embodiment, the outer regions 362 provide the possibility of doping these regions such that they absorb light from a heat radiator, for example a heating lamp, well so that this embodiment is suitable in a particularly advantageous manner for attemperating an outer region AB as described in conjunction with the seventh embodiment according to FIGS. 23 to 27.

In contrast to the embodiments described in the above, the laser radiation field 424 of the twelfth embodiment penetrates both the surfaces 424 as well as the cooling surfaces 414 of all the crystals 412.

The twelfth embodiment of an inventive laser amplifying system can be designed either as a laser by providing end mirrors which are arranged in spaced relation to one another in the direction 460 or as a laser amplifier which amplifies a laser radiation field 424 penetrating it.

In all the embodiments described in the above, the crystals are preferably ytterbium-doped crystals, preferably ytterbium-YAG or ytterbium-FAP.

A list of all the materials advantageously used in the aforementioned embodiments of inventive laser concepts for the inventive solid bodies is represented in Table 1. For each material for an inventive solid body the doping is specified, the effective absorption length, the multipass factor, i.e. the number of possible passes of the pumping light through the solid body, the thickness of the solid body preferably used, i.e. the distance between the cooling surface 14 and the surface 22, the pumping power density of the pumping light 32 and the pumped diameter, i.e. the diameter of the region PA penetrated by the pumping light 32.

TABLE 1

| Material | Doping [%] | eff. Absorption Length [mm] | typ. Multi-pass Factor | Thickness [mm] | Pumping Power Density [kW/cm$^2$] | Pumped Diameter [mm] |
| --- | --- | --- | --- | --- | --- | --- |
| Yb:YAG, 300K | 10 | 1 | 8 | 0.2–0.4 | 3–10 | 0.2–10 |
| Yb:YAG, 200K | 20 | 0.3 | 4 | 0.15–0.3 | 1–20 | 0.15–10 |
| Nd:YAG | 1 | 1–4 | 2–4 | 0.5–2 | <5 | 0.5–40 |
| Nd:YVO$_4$ | 2 | 0.15 | 2–4 | 0.1–0.2 | <20 | 0.1–5 |
| Tm:YVO$_4$, 300K | 5 | 0.6 | 4–8 | 0.15–0.4 | 2–5 | 0.15–10 |
| Ti:Al$_2$O$_3$ | 0.1 | 3 | 8 | 0.5–1 | 10–20 | 0.5–20 |
| miscellaneous | | 0.1–3 | 2–8 | 0.1–2 | | 0.1–40 |

We claim:

1. A laser amplifying system comprising:

a solid body comprising a laser-active material arranged in a laser radiation field, said solid body being in the shape of a thin plate with an upper or lower side comprising a cooling surface having an extension greater in a first direction than a thickness of the solid body measured at right angles to said cooling surface, a pumping light source for pumping the laser-active material, and a solid cooling element forming a carrier for said solid body, said solid body transferring heat created therein areally to said solid cooling element via said cooling surface so that a temperature gradient results in said solid body in a direction towards said cooling surface, said laser radiation field propagating approximately parallel to the temperature gradient in the solid body.

2. A laser amplifying system as defined in claim 1, wherein the cooling element is made from a material having a heat conductivity greater than the heat conductivity of the solid body.

3. A laser amplifying system as defined in claim 1, wherein the thickness of the cooling element at right angles to the cooling surface, in a region bordering on the solid body, is greater than the quotient resulting from the area of the cooling surface divided by its circumference.

4. A laser amplifying system as defined in claim 1, wherein the cooling element has a carrier surface for the solid body, said carrier surface being larger than the cooling surface.

5. A laser amplifying system as defined in claim 1, wherein the solid body transfers the heat created therein from the cooling surface to the cooling element over the entire surface of said cooling surface.

6. A laser amplifying system as defined in claim 1, wherein the cooling element has a heat-transferring surface in contact with a cooling medium, said surface amounting to a multiple of the area of the cooling surface.

7. A laser amplifying system as defined in claim 1, wherein the pumping light source comprises one or more laser or superradiation diodes.

8. A laser amplifying system as defined in claim 7, wherein the pumping light of the laser or superradiation diode is guided to the solid body by a light guide.

9. A laser amplifying system comprising:

a solid body comprising a laser-active material arranged in a laser radiation field, said solid body having a cooling surface, a pumping light source for pumping the laser-active material, and a solid cooling element forming a carrier for the solid body, said solid body transferring heat created therein areally to said solid cooling element via the cooling surface so that a temperature gradient results in said solid body in a direction towards the cooling surface, said laser radiation field propagating approximately parallel to the temperature gradient in the solid body and said cooling element being designed to be transparent for the laser radiation field.

10. A laser amplifying system as defined in claim 9, wherein the cooling element and the solid body are penetrated by the laser radiation field in a direction transverse to the cooling surface.

11. A laser amplifying system as defined in claim 9, wherein the laser radiation field penetrates a plurality of consecutive solid bodies and that a cooling element is arranged between each of the consecutive solid bodies.

12. A laser amplifying system comprising:

a solid body comprising a laser-active material arranged in a laser radiation field, said solid body having a cooling surface;

a reflector for the laser radiation field arranged on a side of the solid body bearing the cooling surface;

a metal layer on the side of the reflector located opposite the solid body;

a pumping light source for pumping the laser-active material;

a solid cooling element forming a carrier for the solid body, said metal layer being connected to said cooling element via a fixing material;

said solid body transferring heat created therein areally to said solid cooling element via said cooling surface so that a temperature gradient results in said solid body in a direction towards the cooling surface, with said laser radiation field propagating approximately parallel to said temperature gradient.

13. A laser amplifying system as defined in claim 12, wherein the entire cooling surface of said solid body rests on the reflector for the laser radiation field.

14. A laser amplifying system as defined in claim 13, wherein the heat from the solid body is introduced areally into a cooling body of said cooling element via said reflector, said metal layer and said fixing material.

15. A laser amplifying system as defined in claim 13, wherein the reflector comprises a reflective layer applied to said cooling surface.

16. A laser amplifying system as defined in claim 12 wherein said reflector is formed by a highly reflective layer applied directly to the cooling surface of the solid body.

17. A laser amplifying system as defined in claim 12 wherein said metal layer is connected to the cooling body by means of a soft metal.

18. A laser amplifying system as defined in claim 12, wherein the laser radiation field enters the solid body from a surface of said solid body located opposite the cooling surface.

19. A laser amplifying system comprising:

a solid body comprising a laser-active material arranged in a laser radiation field, said solid body having a cooling surface and a side surface extending transversely to the cooling surface;

a solid cooling element forming a carrier for said solid body, said solid body transferring heat created therein areally to said solid cooling element via the cooling surface so that a temperature gradient results in said solid body in a direction towards the cooling surface, with said laser radiation field propagating approximately parallel to said temperature gradient;

a source for generating pumping light, said pumping light being coupled into said solid body via said side surface for pumping the laser-active material and being guided by reflection in the solid body in a direction approximately parallel to the cooling surface.

20. A laser amplifying system as defined in claim 19 wherein the pumping light is guided in the solid body by the cooling surface and a surface located opposite the cooling surface.

21. A laser amplifying system comprising:

a solid body comprising a laser-active material arranged in a laser radiation field, said solid body being in the shape of a thin plate with one of an upper and lower side comprising a cooling surface, said cooling surface having an extension greater in a first direction than a thickness of the solid body measured at right angles to said cooling surface, a solid cooling element forming a carrier for the solid body, said solid body transferring heat generated therein areally to said solid cooling element via said cooling surface resulting in a temperature gradient in said solid body in a direction towards the cooling surface, with said laser radiation field propagating approximately parallel to said temperature gradient, and a source for producing pumping light to pump the laser-active material, said pumping light being guided in said solid body in a direction of guidance substantially transverse to said temperature gradient by total internal reflection at said upper and lower sides of said thin plate.

22. A laser amplifying system as defined in claim 21 wherein said solid body is arranged such that the pumping light diverges therein to such an extent that it impinges on surfaces of the solid body guiding said pumping light at an angle close to the limiting angle of said total reflection.

23. A laser amplifying system comprising:

a solid body comprising a laser-active material arranged in a laser radiation field, said solid body being in the shape of a thin plate with one of an upper and lower side comprising a cooling surface, said cooling surface having an extension greater in a first direction than a thickness of the solid body measured at right angles to said cooling surface, a solid cooling element forming a carrier for the solid body, said solid body transferring heat created therein areally to said solid cooling element via the cooling surface so that a temperature gradient results in said solid body in a direction towards the cooling surface, with said laser radiation field propagating approximately parallel to the temperature gradient in the solid body; and a source for producing pumping light to pump the laser-active material, said pumping light being coupled into said solid body via a surface located opposite the cooling surface.

24. A laser amplifying system as defined in claim 23 further comprising a reflector for the pumping light on the side of the solid body on which the cooling surface is located.

25. A laser amplifying system as defined in claim 24, wherein the reflector for the laser radiation field and the reflector for the pumping light are identical.

26. A laser amplifying system as defined in claim 24, wherein the pumping light penetrates the solid body at least twice.

27. A laser amplifying system as defined in claim 26, wherein the pumping light beam reflected by the reflector is again reflected back into the solid body and onto the reflector by a mirror.

28. A laser amplifying system comprising:

a solid body comprising a laser-active material arranged in a laser radiation field, said solid body having a cooling surface, a pumping light source for pumping the laser-active material, a solid cooling element forming a carrier for the solid body, said solid body transferring heat created therein areally to said solid cooling element via the cooling surface so that a temperature gradient results in said solid body in a direction towards the cooling surface, with said laser radiation field propagating approximately parallel to the temperature gradient in the solid body, said laser amplifying system being non-resonant for laser radiation fields extending in planes parallel to the cooling surface.

29. A laser amplifying system as defined in claim 28, wherein said pumping light source pumps said laser-active material via a light guide emitting pump light adjacent a side surface of said solid body, said system further comprising:

a refractive material between said light guide and said side surface, said refractive material having a refractive index that is in a range extending from the refractive index of said light guide to the refractive index of said solid body, inclusively.

30. A laser amplifying system as defined in claim 29, wherein the solid body has an inner region comprising the laser-active material and an outer region free from the laser-active material.

31. A laser amplifying system as defined in claim 30, wherein the outer region has a material with the same refractive index as the inner region.

32. A laser amplifying system as defined in claim 30, wherein the outer region and the inner region are connected with one another by bonding.

33. A laser amplifying system comprising:

a solid body comprising a laser-active material arranged in a laser radiation field and having a cooling surface, a solid cooling element forming a carrier for the solid body, said solid body transferring heat created therein areally to a solid cooling element via the cooling surface so that a temperature gradient results in said solid body in a direction towards the cooling surface, with said laser radiation field propagating approximately parallel to the temperature gradient in the solid body, and a source of pump light for pumping the laser-active material via a surface of the solid body that is penetrated by the pump light, said surface penetrated by the pump light being provided with an antireflective coating.

34. A laser amplifying system comprising:

a solid body comprising a laser-active material arranged in a laser radiation field and having a cooling surface, a solid cooling element forming a carrier for the solid body, said solid body transferring heat created therein areally to said solid cooling element via said cooling surface so that a temperature gradient results in said solid body in a direction towards the solid cooling surface, with said laser radiation field propagating approximately parallel to the temperature gradient in the solid body, a pumping light source for pumping the laser-active material, and a surface of the solid body being penetrated by the laser radiation field and being provided with an antireflective coating.

35. A laser amplifying system comprising:

a plurality of solid bodies, each comprising a laser-active material arranged in and penetrated by a laser radiation field and each having a cooling surface, a pumping light source for pumping the laser-active material, a carrier for each of the solid bodies, said carrier forming a solid cooling element for receiving heat transferred areally from the solid body via the cooling surface of the solid body so that a temperature gradient results in the solid body in a direction towards its cooling surface, with said laser radiation field propagating approximately parallel to the temperature gradient in the solid body.

36. A laser amplifying system as defined in claim 35, wherein the laser radiation field is subjected to a plurality of reflections and a solid body is arranged in the region of several of these reflections.

37. A laser amplifying system as defined in claim 36, wherein the reflections take place at a reflector comprised by a cooling element for the respective solid body.

38. A laser amplifying system comprising:
- a solid body including a laser-active material arranged in a laser radiation field, said solid body having a cooling surface,
- a solid cooling element forming a carrier for said solid body and receiving heat created in said solid body by an areal transfer via said cooling surface so that a temperature gradient results in said solid body in a direction towards said cooling surface,
- a first reflector arranged between said solid body and said cooling element,
- a second reflector arranged in spaced relationship with a surface of said solid body opposite said cooling surface, said first and second reflectors forming a resonator for said laser system and defining said laser radiation field propagating approximately parallel to said temperature gradient and between said reflectors, and
- a pumping light source for pumping said laser-active material.

39. A laser amplifying system comprising:
- a solid body comprising a laser-active material arranged in a laser radiation field and having a cooling surface,
- a pumping light source for pumping the laser-active material,
- a solid cooling element forming a carrier for the solid body, said solid body transferring heat created therein areally to said solid cooling element via the cooling surface so that a temperature gradient results in said solid body in a direction towards the cooling surface, with said laser radiation field propagating approximately parallel to the temperature gradient in the solid body and said temperature gradient in the solid body being essentially constant transversely to the direction of propagation of the laser radiation field in the region penetrated by the laser radiation field.

40. A laser amplifying system as defined in claim 39, wherein the solid body extends beyond the cooling surface with an outer region in a direction parallel to the cooling surface.

41. A laser amplifying system as defined in claim 39, wherein the cooling surface extends at least over the region penetrated by the laser radiation field in a direction extending parallel to the cooling surface.

42. A laser amplifying system as defined in claim 40, further comprising means for attempering the solid body in a region lying outside the cooling surface.

43. A laser amplifying system as defined in claim 42, further comprising means for attempering the solid body in its region lying outside the cooling surface to a temperature reducing a temperature gradient parallel to the cooling surface or to the surface parallel thereto.

44. A laser amplifying system as defined in claim 42, further comprising means for attempering the solid body in a region lying outside the cooling surface to a temperature above the temperature of the cooling surface.

45. A laser amplifying system as defined in claim 42 wherein the solid body is heatable in a region lying outside the cooling surface.

46. A laser amplifying system comprising:
- a solid body comprising a laser-active material arranged in a laser radiation field and having a cooling surface,
- a pumping light source for pumping the laser-active material,
- a solid cooling element forming a carrier for the solid body, said solid body transferring heat created therein areally to a solid cooling element via the cooling surface so that a temperature gradient results in said solid body in a direction towards the cooling surface, said temperature gradient in the solid body being essentially constant transversely to the direction of propagation of the laser radiation field in the region penetrated by the pumping light and said laser radiation field propagating approximately parallel to the temperature gradient in the solid body.

47. A laser amplifying system as defined in claim 39, wherein the solid body and the solid cooling element are arranged to provide isothermal lines in the solid body that extend towards the cooling surface and to the surface located opposite the cooling surface.

48. A laser amplifying system as defined in claim 47, wherein the solid body and the solid cooling element are arranged with respect to one another such that the course of the isothermal lines outside a region penetrated by the pumping light has a gradient near the surface extending parallel to the cooling surface and close thereto, said gradient being of a comparable dimension to a gradient near the surface extending parallel to the surface opposite the cooling surface and close thereto.

49. A laser amplifying system as defined in claim 48, wherein the solid body and the solid cooling element are arranged with respect to one another such that the two gradients near the surface are essentially of a comparable size.

50. A laser amplifying system comprising:
- a solid body comprising a laser-active material arranged in a laser radiation field and having a cooling surface,
- a pumping light source for pumping the laser-active material, said cooling surface of said solid body extending beyond the region penetrated by the pumping light in a direction extending parallel to the cooling surface,
- a solid cooling element forming a carrier for the solid body, said solid body transferring heat created therein areally to said solid cooling element via the cooling surface so that a temperature gradient results in said solid body in a direction towards the cooling surface, with said laser radiation field propagating approximately parallel to the temperature gradient in the solid body.

* * * * *